United States Patent [19]

Noguchi et al.

[11] 4,034,720

[45] July 12, 1977

[54] INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 554,237

[22] Filed: Feb. 28, 1975

[30] Foreign Application Priority Data

Mar. 1, 1974 Japan .............................. 49-24373
June 6, 1974 Japan .............................. 49-64717
July 16, 1974 Japan .............................. 49-81894

[51] Int. Cl.² .................. F02M 39/00; F02B 19/10; F02B 19/18
[52] U.S. Cl. ...................... 123/32 SP; 123/32 EB; 123/32 L; 123/191 SP; 123/139 AW
[58] Field of Search .......... 123/75 B, 32 SP, 32 ST, 123/191 S, 191 SP, 32 L, 32 EA, 139 AW

[56] References Cited

U.S. PATENT DOCUMENTS

| 3,174,470 | 3/1965 | von Seggern et al. | 123/32 SP |
| 3,283,751 | 11/1966 | Goossak | 123/32 SP |
| 3,974,818 | 8/1976 | Noguchi et al. | 123/32 SP |

Primary Examiner—Ronald B. Cox
Attorney, Agent, or Firm—Cushman, Darby & Cushman

[57] ABSTRACT

The invention discloses an internal combustion engine wherein each cylinder includes a main combustion chamber, an intake port opening into the main combustion chamber, an intake valve for opening and closing the intake port, an intake passage communicating with the main combustion chamber through the intake port for charging the lean mixture into a main combustion chamber, a trap chamber with a spark plug, and a fuel injection nozzle disposed in the intake passage and actuatable in response to a signal from a control system to inject a fuel at least one time during the suction stroke, thereby causing a rich mixture to be trapped in a trap chamber to ensure the positive ignition. The fuel is also injected during another stroke other than the suction stroke in which the fuel is completely vaporized, so that the lean mixture, may be charged into the main combustion chamber during the next suction stroke. Thus, the HC emission may be substantially reduced. According to one embodiment of the present invention, the ratio of the quantity of the fuel to be injected during the suction stroke to the total quantity of the fuel to be injected in each cycle of the engine is varied so that the rich mixture (in a minimum quantity but sufficient for ensuring the positive ignition in the trap chamber) may be supplied, so as to further reduce the pollutant emission.

22 Claims, 20 Drawing Figures

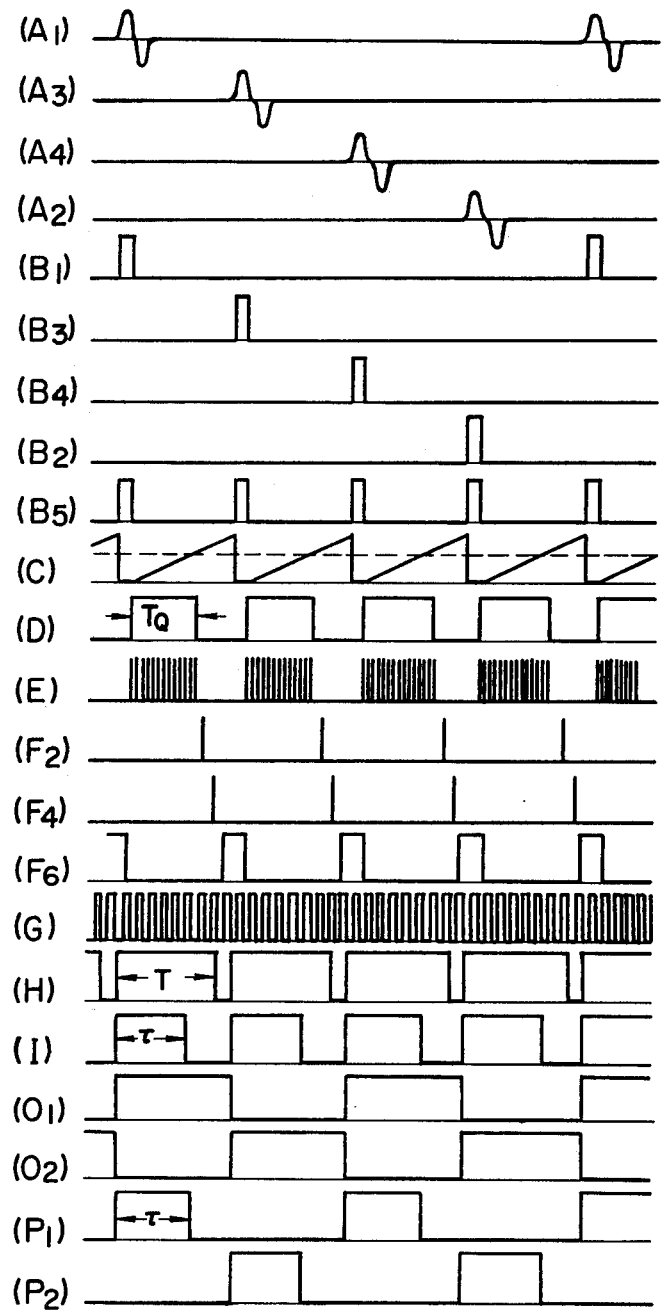

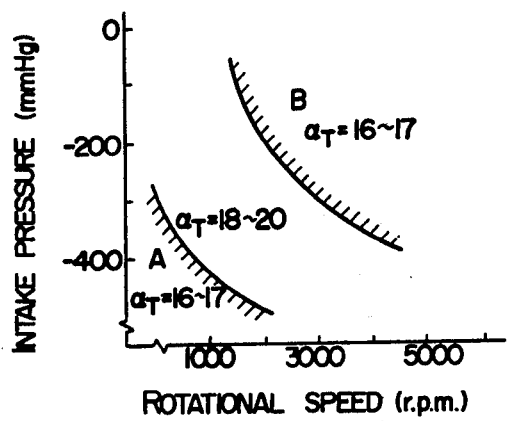
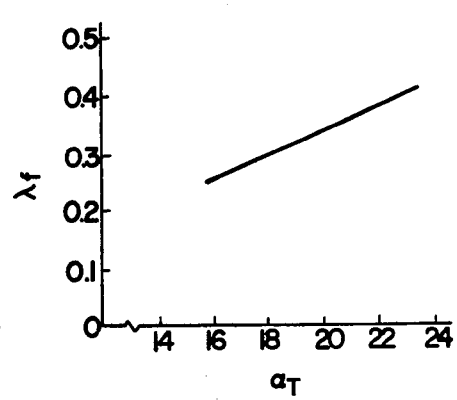
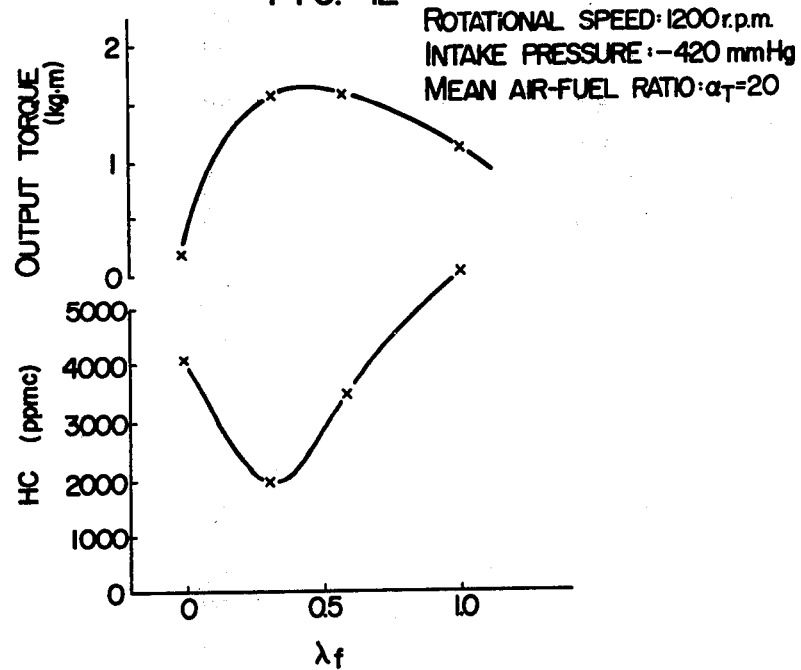

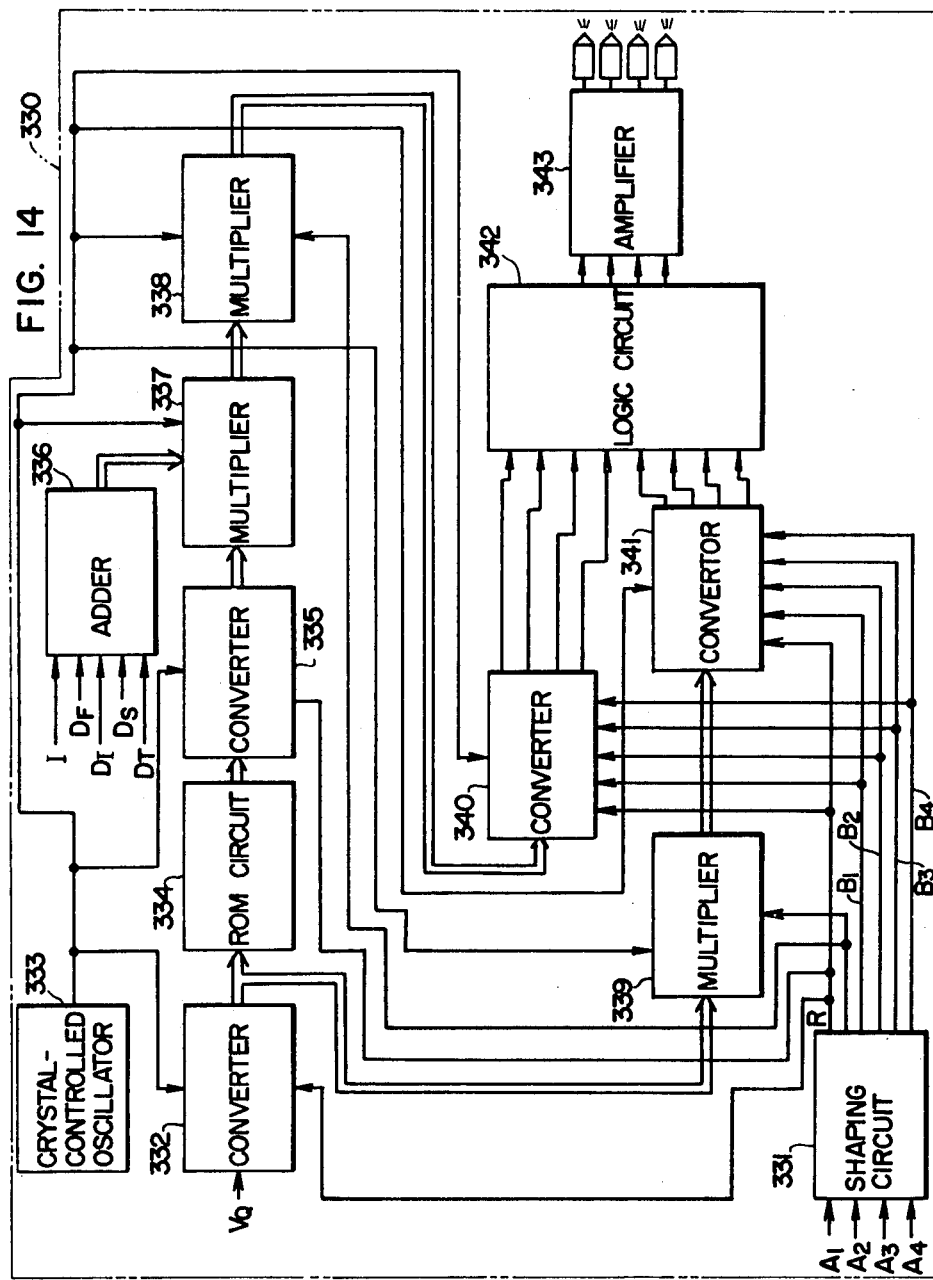

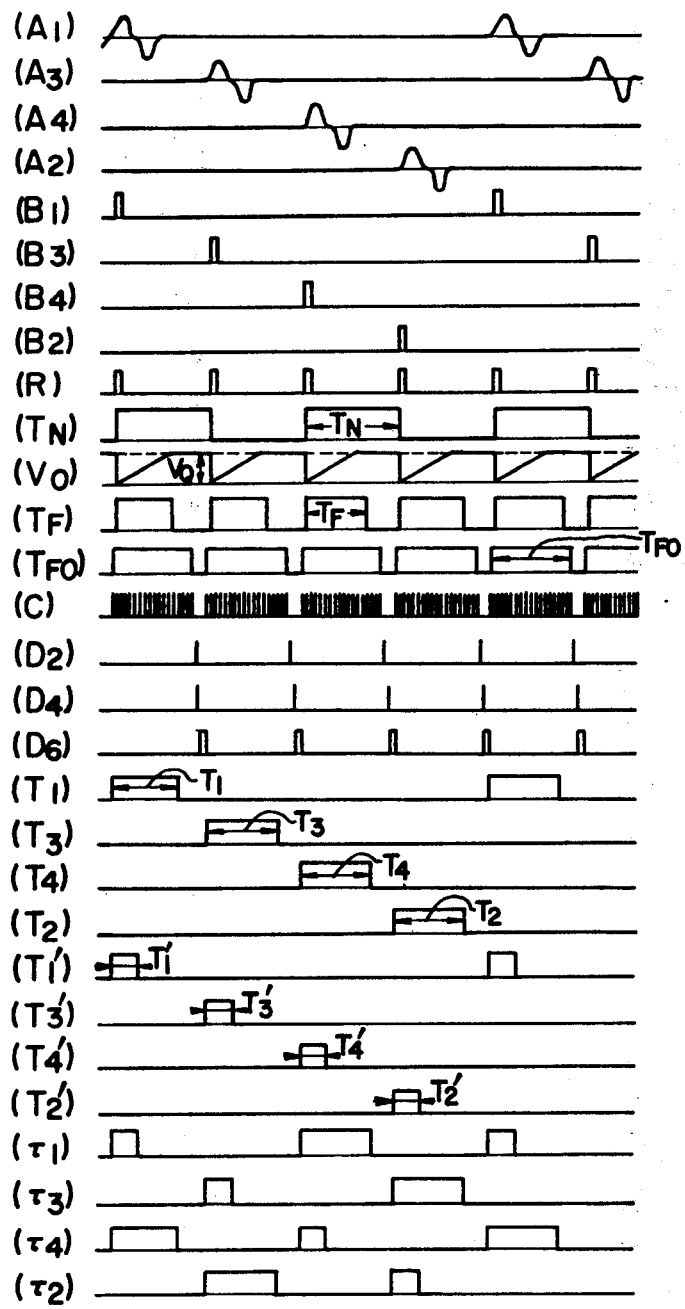

INTERNAL COMBUSTION ENGINE

The present invention relates generally to internal combustion engines with minimum pollutant emission, and more particularly to stratified internal combustion engines of the type in which the easy-to-ignite rich mixture in a minimum quantity only sufficient to ensure a positive ignition is charged in the proximity of the spark plugs so as to start the combustion of the lean mixture in the combustion chamber, thereby reducing the pollutant emission.

In the stratified internal combustion engines of the type described, the combustion chamber consists of, in general, a main combustion chamber and a trap chamber with a spark plug, and the fuel supply system consists of, in general, means for charging the lean mixture and means for charging the rich mixture. The lean mixture is admitted into the main combustion chamber while the rich mixture is admitted into the trap chamber so that the generally lean mixture may be burnt in the main combustion chamber by the ignition or the relatively rich mixture in the trap chamber by the spark plug. In order to charge the rich mixture, the rich mixture supply system employing a carburetor or a fuel injection system employing fuel injection nozzles may be used. However, in multi-cylinder engines it is advantageous to employ a fuel injection system in order to ensure the uniform distribution of the rich mixture (fuel) into a plurality of cylinders and to improve the response of the engine under transient conditions such as acceleration or deceleration.

In the conventional stratified internal combustion engines with a fuel injection system, the fuel injection nozzle is directly opened into the trap chamber or a passage in direct communication with the trap chamber. The fuel (rich mixture) is therefore positively charged into the trap chamber so that stratified combustion may be ensured, but such conventional fuel injection systems have many defects. For instance, when the fuel injection nozzle is directly opened into the trap chamber, the discharge orifice thereof is directly subjected to the elevated temperature and pressure of the combustion gases so that the fuel injection nozzle must be made of a highly expensive material capable of withstanding such elevated temperatures and pressures. When the fuel injection nozzle is opened into the passage in direct communication with the trap chamber, an intake valve for redirecting the rich mixture must be additionally installed within the passage in direct communication with the trap chamber accordingly the construction of the cylinder head is very complex.

According to the present invention, the fuel injection nozzle is opened into the intake passage or manifold through which the lean mixture is admitted into the cylinder. Therefore, the fuel injection nozzles may be made of a less expensive material, and the complex construction of the cylinder head may be avoided. Moreover, since the mixture produced by the injection of the fuel by the fuel injection nozzle becomes locally very rich, the rich fuel mixture injected during the suction stroke in which the intake valve (which opens the intake port in order to admit the lean mixture) is opened is positively directed toward and trapped in the trap chamber thereby ensuring the efficient stratified combustion. It is imperative to inject the fuel during the suction stroke in order to attain the efficient stratified combustion, but complete vaporization of the fuel injected during the suction stroke cannot be attained, thus resulting in an increase in quantity of unburned fuel. In some cases, a part of the injected fuel in the form of liquid drops is trapped in the trap chamber, wetting the spark plug so that the ignition of the rich mixture becomes impossible. When the fuel is injected during a stroke or strokes other than the suction stroke; that is, when the intake valve is closing the intake port, the injected fuel may be vaporized satisfactorily because there is a sufficient time before it is admitted into the combustion chamber. However, the injected fuel tends to be widely diffused into the air flow or lean mixture in the intake passage or manifold so that the rich mixture may be not trapped in the trap chamber. As described above, stratified combustion and hence engine operation are strongly influenced by the fuel injection timing.

FIGS. 1a and 1b show the results of the experiments conducted by the inventors in order to investigate the influence of injection timing upon engine operation. The experiments conducted under the conditions that the rotational speed of the engine is 1,500 rpm; the negative pressure in the intake manifold is −280 mm Hg, and the overall mean air-fuel ratio of the rich and lean mixtures is 18. FIG. 1a shows the relationship between the output torque and the injection timing while FIG. 1b, shows the relationship between the HC emission and the injection timing. From FIG. 1a, it is seen that when the fuel injection is made during the suction stroke, the suitably rich mixture may be trapped in the trap chamber so that the maximum output torque may be produced, but the HC emission also becomes maximum as shown in FIG. 1b. Especially when the fuel injection is made toward the end of the suction stroke, the HC emission is considerably increased because the vaporization time for the injected fuel becomes shorter.

The present invention was made to overcome the above and other problems encountered in the conventional stratified internal combustion engines with a fuel injection system. The present invention is characterized in that the fuel injection nozzle is opened into the intake passage or manifold, and the fuel is injected a plurality of times in each cycle of the engine, at least one fuel injection being made during the suction stroke so that the rich mixture may be trapped in the trap chamber with at least another fuel injection being made during another stroke other than suction stroke so that complete vaporization of the injected fuel may be ensured. The present invention is further characterized in that the ratio of the quantity of the fuel injected during the suction stroke to the overall quantity of fuel injected during each cycle of the engine may be suitably varied depending upon the operating conditions of the engine so that a rich mixture in a minimum quantity only sufficient to ensure positive ignition may be trapped in the trap chamber.

One of the objects of the present invention is, therefore, to provide an internal combustion engine in which the positive trap of the rich mixture in the trap chamber and the complete vaporization of the injected fuel may be attained under the optimum conditions, whereby the toxic emissions may be minimized.

Another object of the present invention is to provide an internal combustion engine in which the ratio of the quantity of the fuel injected during the suction stroke to the overall quantity of the fuel injected during each stroke of the engine may be optimumly varied in response to the operating conditions of the engine so that pollutant emissions may be minimized over the whole operating range of the engine.

Briefly stated, the present invention provides an internal combustion engine having at least one cylinder wherein each of said at least one cylinder includes a main combustion chamber into which is charged a lean mixture; an intake port opening into the main combustion chamber; an intake valve for opening and closing the intake port; an intake passage hydraulically communicating through the intake port with the main combustion chamber and used mainly for charging the lean mixture into the main combustion chamber; a trap chamber provided with a suction aperture through which is trapped in the trap chamber the rich mixture when the intake port is opened; a spark plug fronting on the trap chamber; and a fuel injection system comprising a fuel injection nozzle provided with a discharge orifice through which the fuel is injected; and a fuel injection control system for controlling the fuel injection nozzle in such a way that the fuel may be injected at least one time during the suction stroke and at least one more time during another stroke other than the suction stroke in each cycle of the engine, the discharge orifice of the fuel injection nozzle being so positioned in the intake passage that the fuel injected during the suction stroke may be directed toward the suction aperture of the trap chamber.

The above and other objects, features and advantages of the present invention will become more apparent from the following description of the preferred embodiments thereof taken in conjunction with the accompanying drawings.

FIG. 10 shows signal waveforms used for the explanation of the fuel injection control system shown in FIGS. 9a and 9b;

FIG. 11 shows the air-fuel ratio characteristic curves under various operating conditions of the statified internal combustion engine;

FIG. 12 is a diagram showing the relationship between the fuel injection ratio, on one hand, and the output torque and HC emission, on the other hand, in the stratified internal combustion engine in which fuel injections is effected a plurality of times during each cycle of the engine;

FIG. 13 is a diagram showing the relationship between the mean air-fuel ratio $\alpha T$ and the optimum fuel injection ratio $\lambda f$;

FIG. 14 is a block diagram of an another fuel injection control system used with the engine shown in FIG. 8;

FIG. 16 shows signal waveforms used for the explanation of the fuel injection control system shown in FIGS. 14, 15a and 15b.

Same reference numerals are used to designate similar parts throughout the figures.

The preferred embodiments of the present invention concerns four-cylinder engines, but for the sake of simplicity, the construction and mode of operation of only one cylinder will be described.

FIRST EMBODIMENT, FIGS. 2–7

Figure 2:
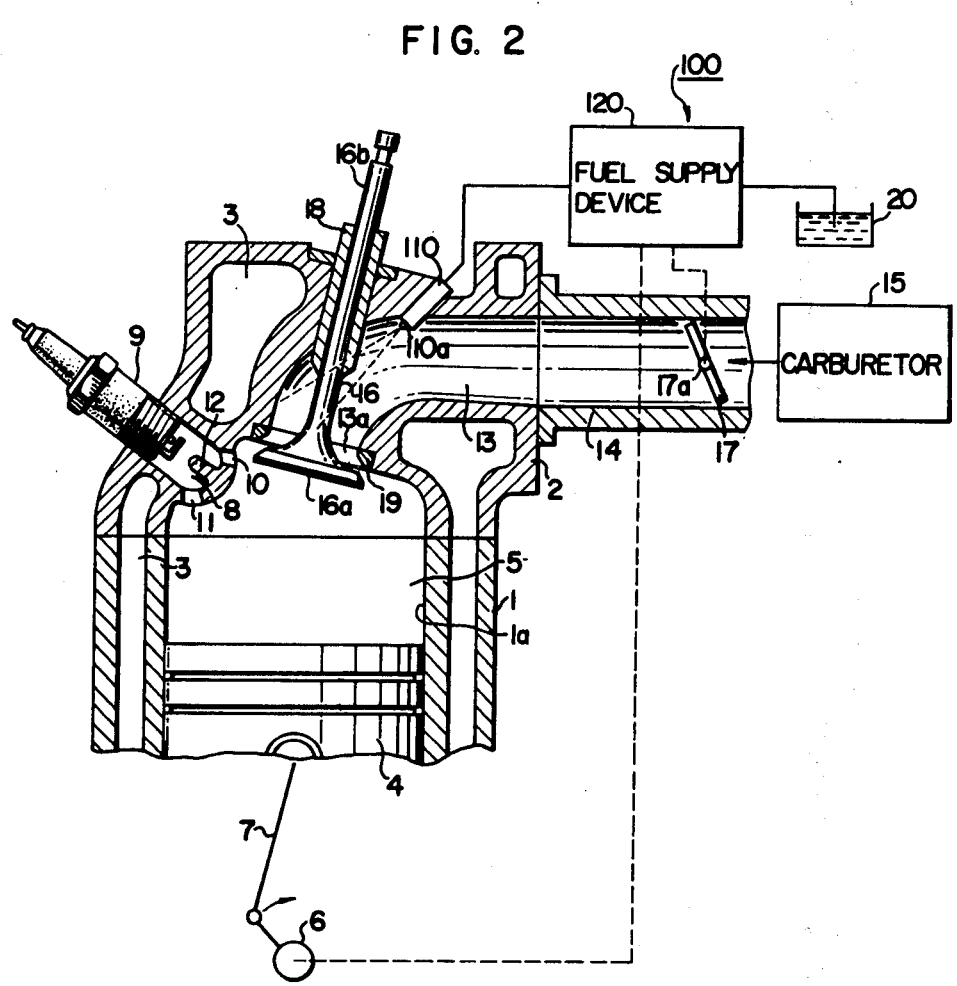
FIG. 2 is a fragmentary sectional view of a first embodiment of the present invention.

Referring first to FIG. 2, a cylinder block 1 forms four cylinder bores 1a one of which is illustrated in the figure. A piston 4 is mounted in the cylinder bore 1a and reciprocates in same. A cylinder head 2 having a lower surface encloses the cylinder bore 1a to form a main combustion chamber 5. A passage 3 for a coolant is formed in a cylinder block 1 and the cylinder head 2. The piston 4 is connected through a connecting rod 7 to a crankshaft 6 so that the reciprocal motion of the piston 4 may be converted into the rotation of the crankshaft 6.

A trap chamber 8 is formed through the wall of the cylinder head 2, and is air-tightly fitted with a spark plug 9. It should be noted that the lower or bottom portion of the trap chamber 8 is extended into the main combustion chamber 5 and is provided with a suction aperture 10 located closer to an intake port 13a and a discharge aperture 11 located closer to the top of the piston 4. The space closer to the bottom of the trap chamber 8 is divided by a separating or partition wall 12 into a first chamber in communication with the intake aperture 10 and a second chamber in communication with the discharge aperture 11.

The intake port 13a communicates with a carburetor 15 through an intake passage 13 formed within the cylinder head 2 and an intake manifold 14. Within the intake manifold 14 is disposed a throttle valve 17 rotatably carried by a valve shaft 17a which in turn is operatively coupled to an accelerator pedal (not shown). An intake valve 16 and a valve seat 19 are located at the intake port 13a. The carburetor 15 is so designed as to produce a lean mixture with a high air-fuel ratio. When the intake valve 16 is stroked to open the intake port 13a, the lean mixture produced by the carburetor 15 flows through the intake manifold 14 and the intake manifold 13, and is admitted into the main combustion chamber 5. The quantity of the lean mixture to be admitted into the main combustion chamber 5 is controlled by the throttle valve 17. Instead of communicating the intake manifold 14 with the carburetor 15, the intake manifold 14 may be directly communicated with an air cleaner (not shown).

The intake valve 16 comprises a valve head 16a and a stem 16b which reciprocates through a guide 18 so that the valve head 16a is pressed against the valve seat 19 and is moved away therefrom to close and open the intake port 13a. The reciprocal movement of the valve 16 is synchronized by a valve operating mechanism (not shown) with the rotation of the crankshaft 6 in such a way that while the latter makes two rotations, the valve 16 makes one reciprocal movement. The intake valve 16 is so arranged that when it is opened, the outer periphery of the valve head 16a may be located in the proximity of the bottom portion of the trap chamber 8 extending into the main combustion chamber.

A fuel injection apparatus 100 consists of a fuel injection nozzle 110 which injects the fuel under pressure through a discharge orifice 110a thereof and a fuel supply device 120 which intermittently raises the pressure of the fuel supplied from a fuel tank 20 to feed the fuel to the injection nozzle 110. The nozzle 110 is so fixed in the cylinder head 2 that the orifice 110a thereof is opened into the intake passage 13. More particularly, the nozzle 110 is so positioned that the fuel discharged through the discharge orifice 110a may be substantially tangential to the lean mixture flow (or air flow) flowing through the intake passage 13 (which is brought about during the suction stroke) toward the suction aperture 10 of the trap chamber 8 and may be carried by this flow toward the suction aperture 10 of the trap chamber 8. The fuel injection nozzle 110 is of the type which is opened under the pressure of the fuel from the fuel supply device 120 to inject the fuel into the intake passage 13. It is to be understood that even though only one fuel injection nozzle 110 is shown, every intake passage is provided with a similar fuel injection nozzle. At a suitable timing synchronized with the rotation of the crankshaft 6, the fuel supply device 120 supplies the fuel under pressure to the fuel injection nozzle 110, and also controls the volume of the fuel to be injected depending upon the operating, conditions of the engine. In the instant embodiment, the fuel supply device is of the mechanical type as will be described in detail hereinafter with reference to FIGS. 3 and 4.

Figure 3:
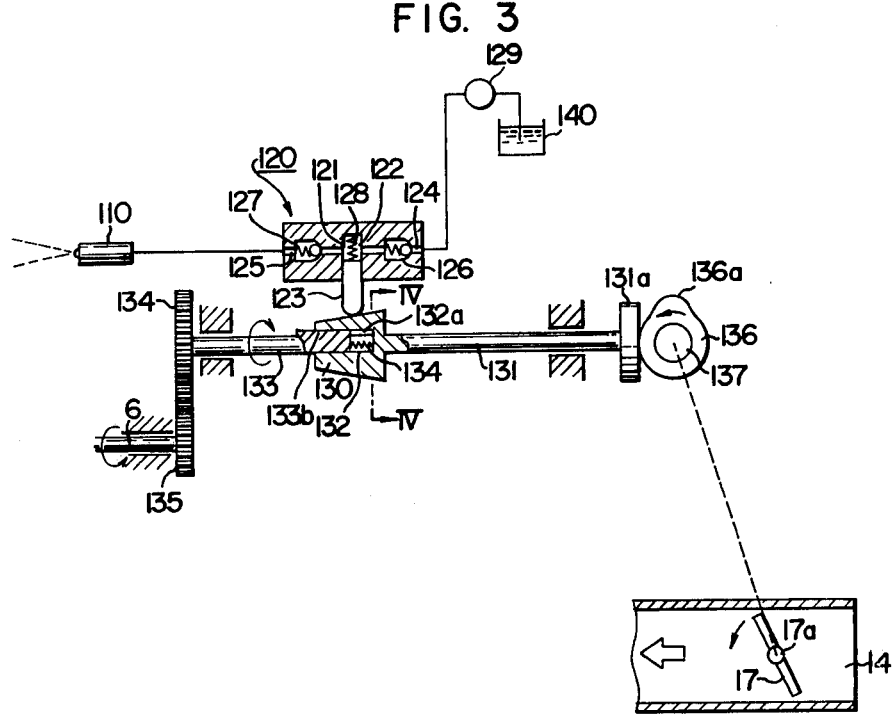
FIG. 3 is a diagrammatic view of a fuel supply device used in the first embodiment shown in FIG. 2.

The fuel supply device generally indicated by the reference numeral 120 in FIG. 3 comprises, in general, a cylinder 121, a plunger 123 which is fitted into the cylinder 121 and defines a plunger chamber 122, an inlet passage 124 and a discharge passage 125 both of which are in communication with the plunger chamber 122, an inlet valve 126 and a discharge valve 127 inserted into the inlet and discharge passages 124 and 125, respectively, and a biasing spring 128 for biasing the plunger 123. The inlet passage 124 is in communication through a fuel pump 129 with a fuel tank 140 while the discharge passage or port 125 is in communication with the fuel injection nozzle 110. The fuel pump 129 serves to feed the fuel in the tank 140 into the inlet passage 124.

Figure 4:
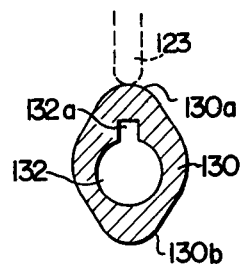
FIG. 4 is a sectional view, on an enlarged scale, taken along the line IV—IV of FIG. 3.

The fuel supply device 120 further comprises a three-dimensional or solid cam 130 with two raised cam surface portions 130a and 130b angularly spaced apart from each other by 180° as best shown in FIG. 4. The lower end of the plunger 123 is pressed against the cam profile of the cam 130 under the force of the biasing spring 128. One end of the cam 130 is connected to one end of an actuating rod 131 while the other end is provided with an axial hole 132 with an internal groove 132a as best shown in FIG. 4. One end of a driving shaft 133 is fitted into this hole 132 with a projection 133b of the driving shaft 133 fitted into the groove 132a of the hole 132 so that the cam 130 may be rotated in unison with the driving shaft 133 and the axial displacement between the cam 130 and the driving shaft 133 may be permitted. A spring 134 is loaded between one end of the driving shaft 133 and the bottom of the hole 132 of the cam 130. The other end of the driving shaft 133 is attached to a gear 134 in mesh with a gear 135 carried by the crankshaft 6. The gear ratio between the gears 134 and 135 is two so that the driving shaft 133 makes one rotation while the crankshaft 6 makes two rotations. Instead of the gears 134, and 135, a synchronizing belt may be employed.

A flange 131a at the other end of the actuating rod 131 is made into contact with a control cam 136 with a cam profile 136a which is carried by a shaft 137 which in turn is operatively connected to the valve shaft 17a of the throttle valve 17 in the intake manifold 14. When the control cam 136 rotates, it causes the actuating rod 131 and hence the cam 130 to displace in the axial direction thereof with respect to the lower end of the plunger 123. In this case, the cam 130 slides over the driving shaft 133 whose position remains unchanged, and the spring 134 within the cam 130 forces the flange 131a of the actuating rod 131 against the control cam 136.

In the instant embodiment, only one fuel supply device 120 is shown and explained, but it is to be understood that four fuel supply devices are provided in practice for a four-cylinder engine.

Next the mode of operation of the fuel supply device 120 with the above construction will be described. Since the rotation of the crankshaft 6 is transmitted through the gears 135 and 134 and the driving shaft 133, the cam 130 rotates so that the plunger 123 is caused to vertically reciprocate. Therefore, the fuel fed into the plunger chamber 122 through the fuel pump 129, the inlet passage 124, and the inlet valve 126 from the fuel tank 140 is compressed and then forced through the discharge passage 125 into the fuel injection nozzle 110 from which the fuel under pressure is discharged through the discharge orifice 110a into the intake passage 13. Since the cam 130 makes one rotation while the crankshaft makes two rotations (that is, during one cycle of the engine operation) and because the cam 130 is provided with two raised cam profiles 130a and 130b, the plunger 123 makes two reciprocal motions while the crankshaft 6 makes two rotations (that is, during one cycle of the engine operation). As a result, the fuel is injected twice through the nozzle 110 during one cycle of the engine. The two fuel injection timings are spaced apart from each other by 180° in terms of the rotation of the crankshaft 6. The volume of the fuel to be injected and the injection period may be suitably selected by the cam surfaces 130a and 130b of the cam 130.

The cam 130 is displaced in the axial direction thereof depending upon the opening degree of the throttle valve 17 because the control cam 136 is operatively coupled to the valve shaft 17a of the throttle valve 17. Therefore the quantity of the fuel to be injected in each time may be controlled in response to the opening degree of the throttle valve 17.

The first injection of the two fuel injections during one cycle of the engine is made during the suction stroke while the second fuel injection is made during one of the three remaining strokes (most preferably during the compression stroke, but in the instant embodiment the second fuel injection is made during the combustion stroke because of the problems encountered in the fabrication of the cam 130). In the instant embodiment, the quantity of the fuel to be injected during the suction stroke is made different from the quanaity of the fuel to be injected during another stroke depending upon the opening degree of the throttle valve 17. That is, the greater the degree of opening of the throttle valve 17, the lesser the quantity of the fuel to be injected during the suction stroke becomes as compared with the quantity to be injected during another stroke. The reason is that with a high load, the demand for the stratification of the rich and lean mixtures is not so severe, but is severe with a low load.

Figure 5A:
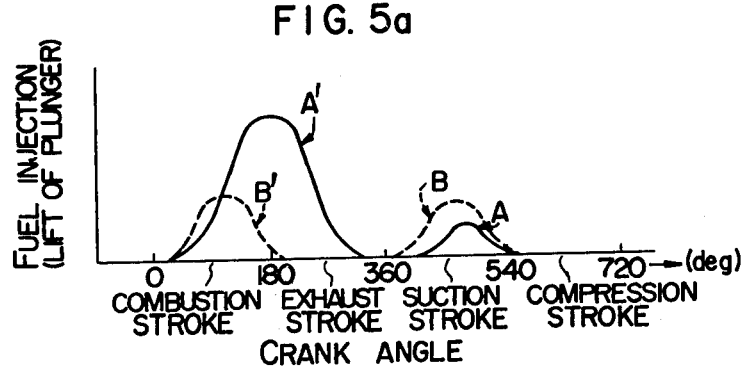
FIGS. 5a and 5b and FIG. 6 are diagrams used for the explanation of the mode of operation of the internal combustion engine in accordance with the present invention.
Figure 5B:
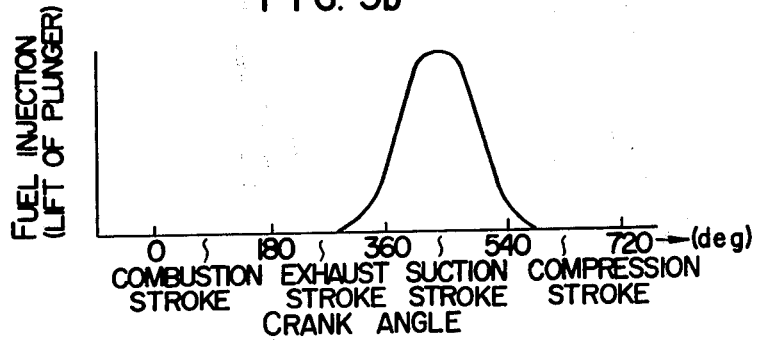
Figure 6:
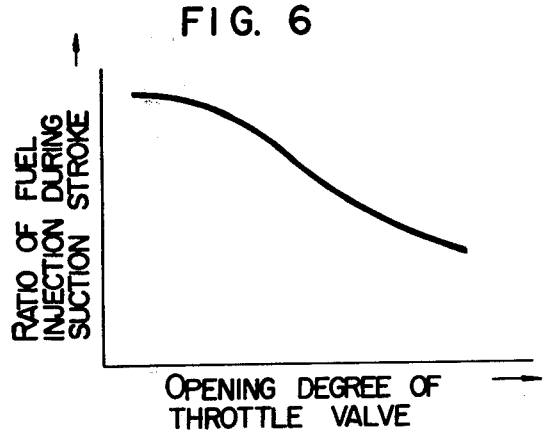

Next referring to FIGS. 5a and 5b, the mode of fuel injection will be described in more detail. The solid curves A and A' shown in FIG. 5a show the fuel injection when the opening degree of the throttle valve 17 is relatively great while the dotted curves B and B' show the fuel injection when the opening degree of the throttle valve 17 is small. The curve shown in FIG. 5b indicates fuel injection is made only one time during one cycle of the engine. The curve in FIG. 6 shows that the greater the opening degree of the throttle valve 17, the lesser the quantity of the fuel to be injected during the suction stroke becomes as described hereinbefore.

The fuel injected during the stroke other than the suction stroke remains during a predetermined time interval within the intake passage 13 until the next suction stroke is started so that the fuel may absorb the heat from the combustion chamber 13 and be vaporized and mixed with the lean mixture or the air flow. The lean mixture thus produced is admitted into the main combustion chamber 5 and the trap chamber 8 together with the lean mixture or air flow flowing from the intake manifold 14 through the intake passage 13 during the next suction stroke. During the suction stroke, the fuel is also injected into the intake passage 13 through the nozzle 110, and the injected fuel is carried by the lean mixture and trapped in the trap chamber 8 in a very effective manner as described hereinbefore.

Figure 7:
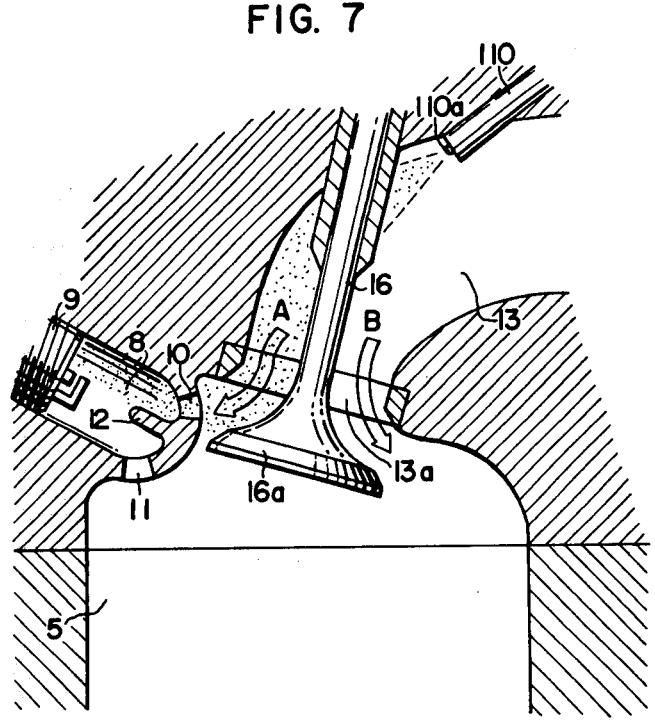
FIG. 7 is a fragmentary view, on an enlarged scale, of the first embodiment of the present invention during the suction stroke.

Next referring to FIG. 7, the mode of fuel injection and admission of the lean mixture during the suction stroke will be described in more detail hereinafter. When the intake valve 16 opens the intake port 13a, the flow A on the side of the trap chamber 8 is directed toward the suction aperture 10 of the trap chamber 8 while the flow B flows into the main chamber 5. The fuel injection nozzle 110 is so positioned that the fuel discharged through the orifice 110a may be tangential to the flow A flowing toward the trap chamber 8 as described hereinbefore. Therefore, the injected fuel indicated by the black dots is carried by the flow A through the suction aperture 10 into the trap chamber 8 to produce a rich mixture within the same. The valve head 16a serves to effectively redirect the flow A carrying the injected fuel toward the suction aperture 10. The remaining gases within the trap chamber 8 are discharged through the discharge aperture 11 of the trap chamber 8 into the main combustion chamber 5. The separating or partition wall 12 in the trap chamber 8 not only prevents the rich mixture admitted into the trap chamber 8 through the suction aperture 10 from being immediately discharged into the main combustion chamber 5 through the discharge aperture 11, but also improves the scavenging efficiency of the trap chamber 8.

Figure 1A:
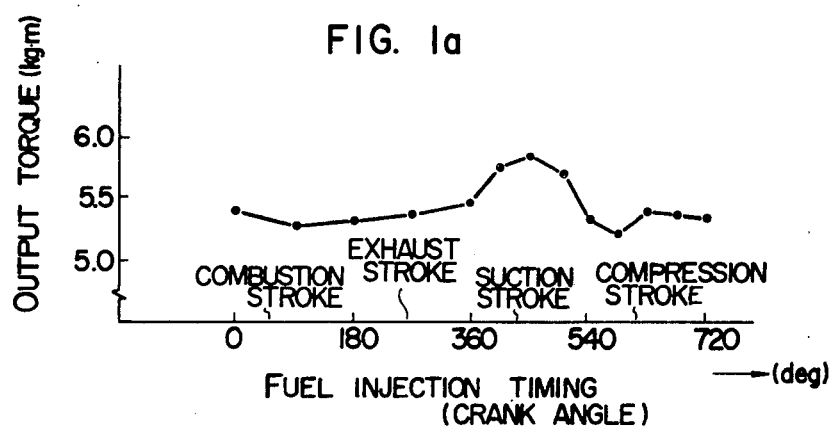
FIG. 1a shows the relationship between the injection timing and the output torque obtained by the experiments conducted by the inventors on a conventional internal combustion engine.
Figure 1B:
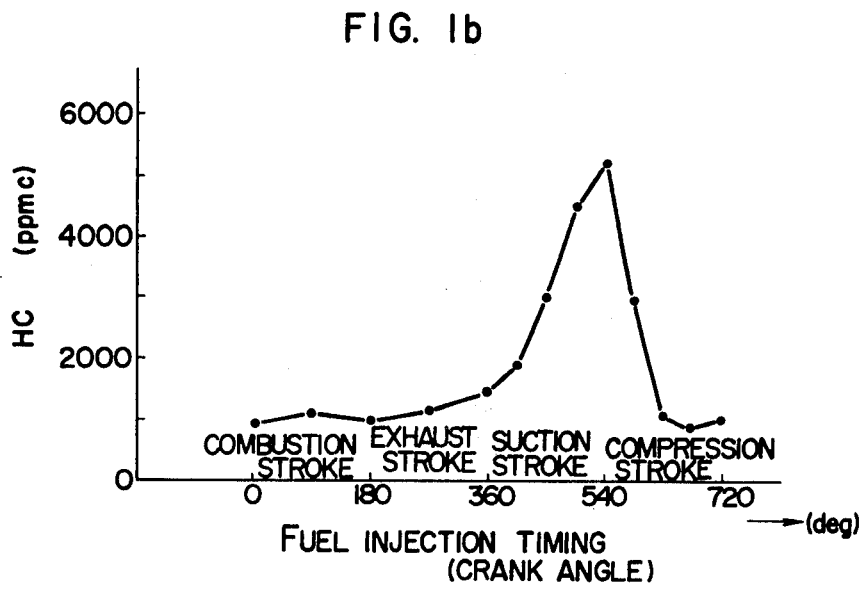
FIG. 1b shows the relationship between the injection timing and the HC emission obtained by the same experiments.

During the suction stroke, trapped in the trap chamber 8 is the rich mixture consisting of the fuel injected through the fuel injection nozzle 110 and the lean mixture in which the fuel injected during the stroke other than the suction stroke is satisfactorily vaporized and mixed with the air. Thus, of the quantity of the fuel required during each cycle of the engine only the quantity required for the stratification of the rich and lean mixtures is injected during the suction stroke while the remaining quantity is injected during another stroke so that the mixture, which is optimum for the stratified combustion and vaporization of the rich mixture in the trap chamber 8, may be trapped in the trap chamber. Except that the fuel is injected through the fuel injection nozzle 110 into the intake passage 13 as described above, the compression, combustion and exhaust strokes are substantially similar to those of the conventional stratified internal combustion engines. Thus, the combustion of the lean mixture is effected during each cycle of the engine so that the undesirable pollutant emission may be minimized According to the experiments conducted by the inventors under the same conditions with those shown in FIGS. 1a and 1b, HC emission was 2,000 ppmc at an output torque of 5.8 kg.m. This means that the HC emission may be reduced to almost one half without causing a decrease in output torque.

The rate of fuel to be trapped in the trap chamber 8 during the suction stroke changes with the change of a load of the engine. Therefore, it is very advantageous for engine efficiency to vary the rate of the fuel to be injected during the suction stroke depending upon the opening degree of the throttle valve 17, but according to the present invention, a sufficiently high engine efficiency may be attained even when the rate of fuel to be injected during the suction stroke remains unchanged.

Figure 8:
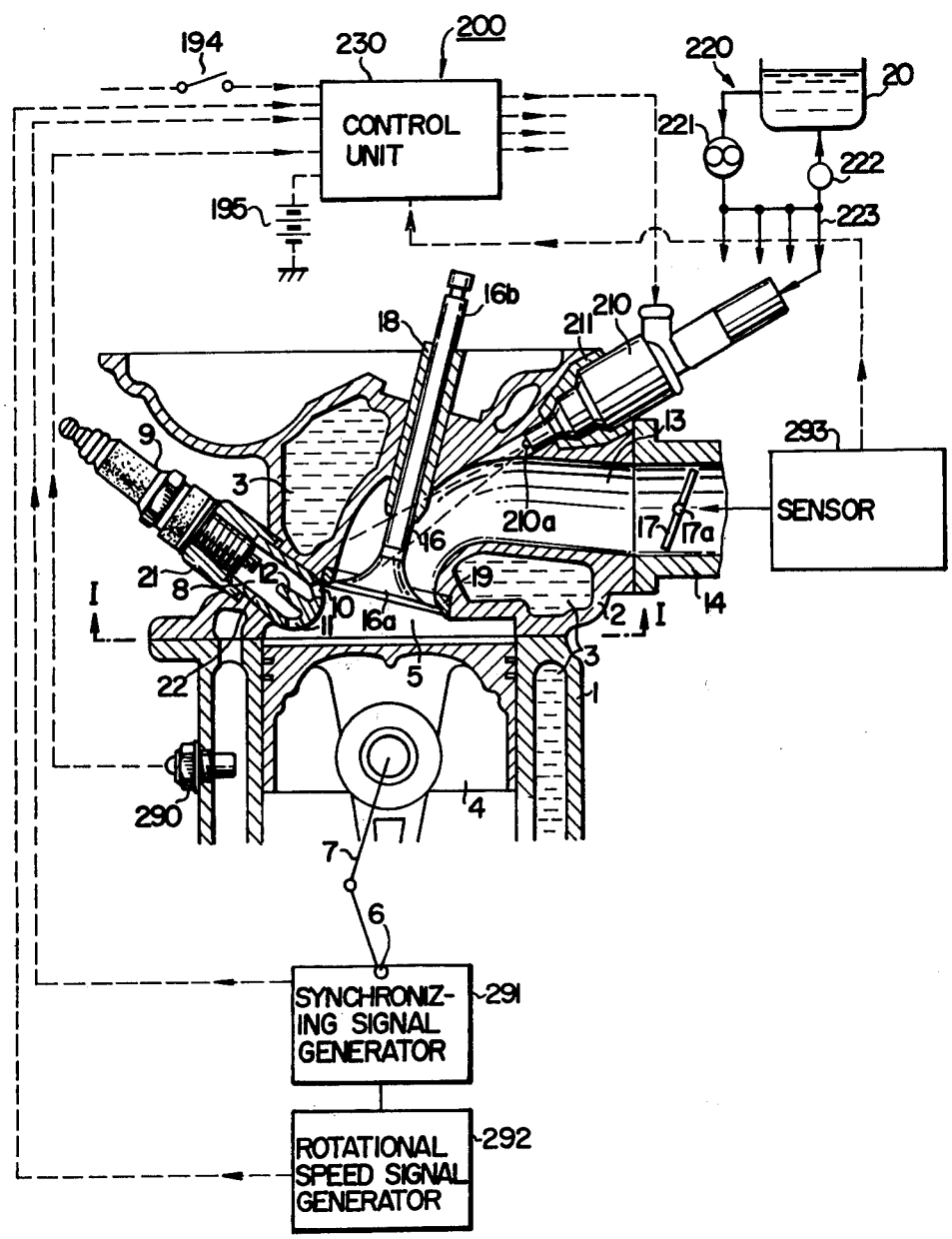
FIG. 8 is a sectional view of a second embodiment of the present invention.

SECOND EMBODIMENT, FIGS. 8, 9 and 10

Next referring to FIGS. 8, 9, and 10, the second embodiment of the present invention employing an electronically controlled fuel injection system will be described. The fuel injection system generally designated by the reference numeral 200 comprises, in general, a solenoid operated fuel injection nozzle 210; a fuel supply system 220 comprising the fuel tank 20, a fuel pump 221, a pressure control valve 222, and four branches 223 each hydraulically connected to the fuel injection nozzle 210; a control unit 230 for generating the electrical signals for actuating the fuel injection nozzles 210; a first sensor 290 for detecting the temperature of the cooling water flowing through the coolant passage 3, thereby detecting the operating condition of the engine; a synchronizing signal generator 291; a signal generator (or tachometer) 292 for generating the electrical signal representative of the rotational speed of the engine; and a second sensor 293 for sensing the volume of the air flowing into the intake manifold 14. Reference numeral 194 denotes a switch, while 195, a power supply. The fuel injection nozzle 210 is thermally isolated from the cylinder head 2 through an insulator 211, and is positioned in a manner substantially similar to that described hereinbefore with reference to the first embodiment of the present invention. In the fuel injection system 220, the fuel pump 221 pumps the fuel from the tank 20 to the fuel injection nozzles 210 through the branches 223, and the pressure of the fuel in the distribution system is controlled by the pressure control valve 222.

The first sensor 290, which is, in general, disposed within the coolant passage 3, may be of the thermistor type for generating the voltage signal representative of the temperature of the cooling water circulating through the coolant passage 3. The synchronizing signal generator 291 is so arranged as to generate the synchronizing signal for each one half (½) rotation of the crankshaft 6 (that is, for each ¼ rotation of a distributor (not shown). The rotational speed signal generator 292 is to generate the rotational speed signal. The second sensor 293 is positioned in the upper stream of the throttle valve 17, and may be of the weir type well-known in the art for generating a voltage signal representative of the volume of the intake air. The control unit 230 calculated the quantity of fuel to be injected in response to the output signals from the first and second sensors 290 and 293, the synchronizing signal generator 291 and the rotational speed signal generator or tachometer 292, and also generates the control signals in response to which the fuel injection nozzle 210 is so actuated as to inject the fuel two times in each cycle of the engine, i.e., one time at the suction stroke and one more time at the combustion stroke. In general, the firing order of the four-cylinder engines is 1-3-4-2. Therefore, the control unit 230 is so designed as to simultaneously actuate the fuel injection nozzles 210 for the first and fourth cylinders and for the second and third cylinders, respectively. Thus, the fuel injection nozzles 210 are actuated to inject the fuel during the suction and combustion strokes.

Figure 9A:
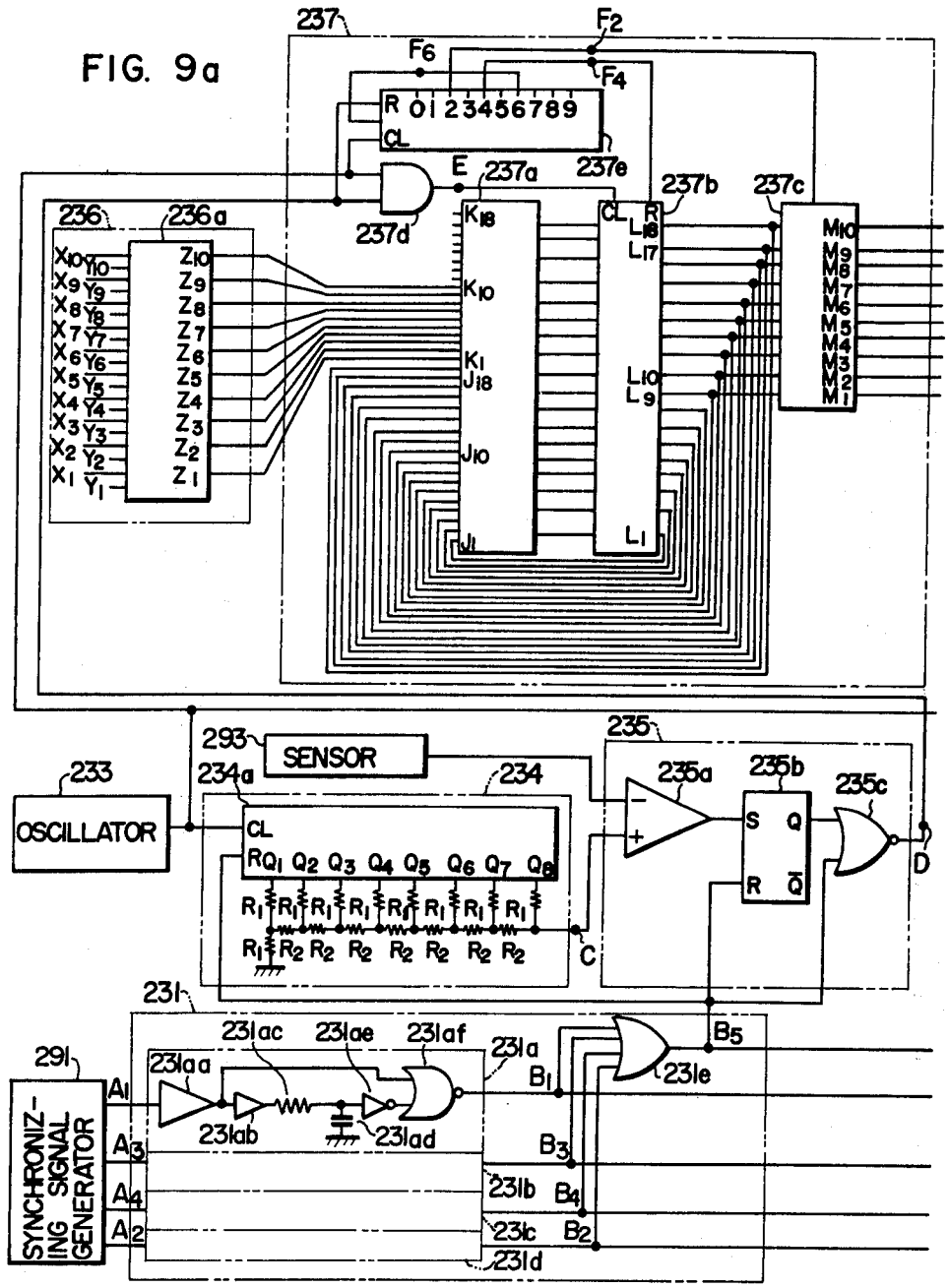
FIGS. 9a and 9b are block diagrams which in combination show a fuel injection control system of the second embodiment.
Figure 9B:
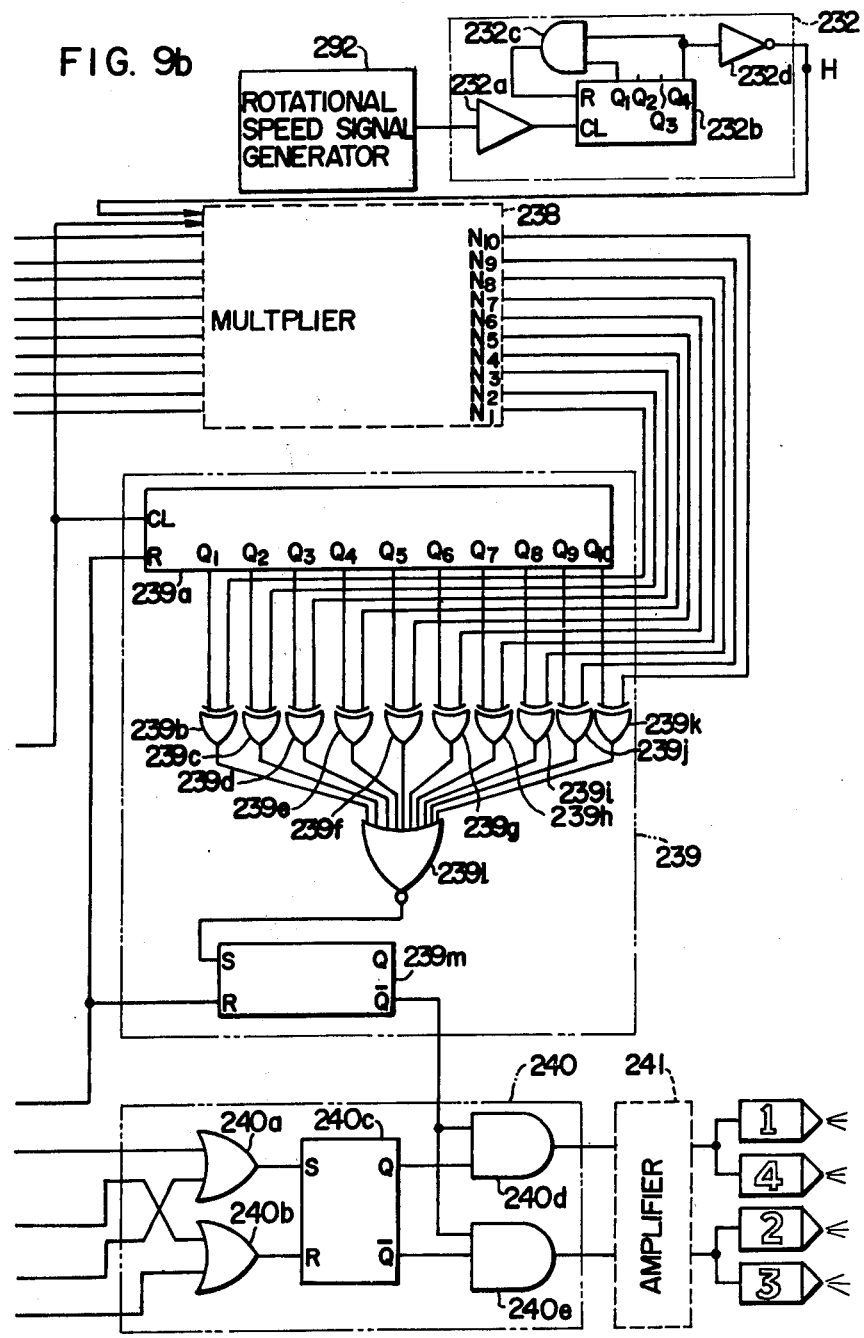

Next referring to FIGS. 9a and 9b, the electronic circuit of the fuel injection system will be described in detail. Reference numeral 231 denotes a shaping circuit for amplifying and shaping the synchronizing signals $A_1$, $A_2$, $A_3$, and $A_4$ from the synchronizing signal generator 291 into the synchronizing signals $B_1$, $B_2$, $B_3$ and $B_4$ and producing the OR signal $B_5$ to these sychronizing signals $B_1$ through $B_4$; 232, a frequency divider for dividing the output signal from the signal generator or tachometer 292 to produce pulse signals with a pulse width in inverse proportion to the rotational speed N of the engine; 233, an oscillator for producing the clock pulses of a predetermined frequency in response to a constant K which in turn is dependent upon the air-fuel ratio (A/F) of the mixture to be supplied to the engine; 234, a digital-to-analog converter for producing a voltage signal in synchronism with the OR signal $B_5$ and in proportion to the number of the clock pulses; 235, a comparator system for comparing the voltage signal from the second sensor 293 representative of the intake air volume withh the voltage signal from the D-A converter 234 so as to set KQ (wherein Q is an intake our volume) and to produce pulse signals with a pulse duration in proportion to the intake air volume; 236, an adder or summing circuit for adding a constant 1.00 to a compensation constant K' produced in response to the voltage signal from the first sensor 290 representative of the temperature of the cooling water, thereby delivering the sum $(1.00 + K')$;

237, a first multiplier for giving the product $KQ (1 + K')$ of the outputs from the adder 236 and the comparator system 235; 238, a second multiplier for giving the product $KQ(1 + K')/N$ of the output from the first multiplier 237 and the reciprocal $1/N$ of the rotational speed N of the engine; 239, a converter for producing the pulse signals with the pulse duration in proportion to the output of the second multipler 238; 240, a distributor for distributing the output pulse signals from the converter 239 in a manner to be described in more detail hereinafter; and 241, a power amplifier.

Next referring further to FIG. 10, the construction as well as the mode of operation of each of the above components 231 through 241 will be described in more detail hereinafter.

The synchronizing signal generators 291 comprises, in general, a permanent magnet (not shown) mounted upon a rotor of a distributor (not shown), and four windings or coils with cores (not shown) positioned equiangularly around the rotor. The rotor makes one rotation while the crankshaft 6 makes two rotations so that the synchronizing signals $A_1$–$A_4$ may be generated as indicated at (A1), (A2), (A3), and (A4) in FIG. 10. These synchronizing signals A1 through A4 are synchronized with the suction strokes of the first to fourth cylinders of the engine.

The shaping circuit 231 comprises delay circuits 231a, 231b, 231c, and 231d, and an OR gate 231e. The delay circuit 231a comprises a DC amplifier 231aa (IC, MC3302P, the product of Motolora Corp., USA), a buffer circuit 231ab, a resistor 231ac, a capacitor 231ad, an inverter 231ae, and a NOR gate 231af. The remaining time delay circuits 231b, 231c, and 231d are substantially similar in construction and mode of operation to the delay circuit 231a. The shaping circuit 231 amplifies and shapes the synchronizing signals A1, A2, A3, and A4 from the synchronizing signal generator 291 to produce the synchronizing signals $B_1$ through $B_4$ and the OR signal $B_5$ of these signals as indicated at (B1), (B2), (B3), (B4), and (B5) in FIG. 10.

The construction of the oscillator 233 is not shown, but it may be of the type using a conventional crystal-controlled oscillator for generating clock pulses with the pulse duration depending upon the constant K hich in turn is dependent upon the air-fuel ratio (A/F).

The D-A converter 234 comprises, in general, an 8-bit binary counter 234a and a ladder network of resistors R1 and R2. The binary counter 234a starts counting the clock pulses from the oscillator 233 wherever the counter 234a is reset in response to the OR signal B5 from the shaping circuit 231 so that the sawtooth wave voltage output signal appears at the output terminal C as indicated at (C) in FIG. 10. The angle or rise time of the ramp of the sawtooth wave is in proportion to the constant K representative of the air-fuel ratio A/F.

The comparator system 235 comprises a comparator 235a, a R-S flip-flop 235b, and a NOR gate 235c. The comparator 235a compares the output signal (FIG. 10 (C)) from the D-A converter 234 with the voltage signal (indicated by the dotted lines in FIG. 10 (C)) representative of the intake air volume from the second sensor 293 in such a way that when the sawtooth wave output (C) from the D-A converter 234 exceeds the output voltage signal from the second sensor 293, the comparator 235a generates the output signal, in response to which is set the R-S flip-flop 235b. To the NOR gate 235c are applied the output signal from the flip-flop 235b and the output signal B5 from the OR gate 231e in the shapining circuit 231, and the output signal as shown at (D) in FIG. 10 appears at the output terminal D of the NOR gate 235c. The pulse width TQ of the output signal D is proportional to the intake air volume Q. Thus the comparator system 235 has the function of obtaining the product of the constant K and the intake air volume Q.

The summing circuit 236 comprises a parallel adder (for instance, IC, CD 4008, the product of RCA Corp.). Its input X10 ... X1 represents a binary code representing the constant 1.00; Y10 ... Y1, a binary code representing the temperature of the cooling water; and its output Z10 ... Z1, a binary code representing the sum of the two inputs. For instance, assume that the water temperature coefficient KT = 0.2 in contrast with the constant 1.00. Then, X10 X9 ... X1 = 0001100100, and
Y10 Y9 ... Y1 = 0000010100.

In order to represent in binary code the water temperature coefficient, the integrated circuit, CD 4046, the product of RCA Corp., may be used which converts the voltage signal into the frequency signal.

The first multiplier 237 comprises a parallel adder 237a (for instance, IC, CD 4008, the product of RCA Corp.), a first memory 237b (for instance, IC, CD 4035, the product of RCA Corp.), a second memory 237c (for instance, IC, CD 4042, the product of RCA Corp.), and AND gate 237d, and a counter 237e with a decimal divider (for instance, IC, CD 4017, the product of RCA Corp.). The outputs L18 through L1 from the first memory 237b are applied to the inputs J18 through J1 of the adder 237a, and the counter 237e stops counting when it receives six clock pulses. When the output pulses signal with the pulse width $T_Q$ from the comparator 235 is 1, a number of $n$ clock pulses appears at the output terminal of the AND gate 237d as indicated at (E) in FIG. 10. When the output from the comparator system 235 changes to 0, the clock pulses are counted by the counter 237e. When the second, fourth, and sixth clock pulses are counted, the output signals 1 appear at the terminals F2, F4, and F6 of the counter 237e as indicated at (F2), (F4), and (F6), respectively, in FIG. 10. In response to the fourth clock pulse F4, the first memory 237b is reset so that its outputs L18 through L1 become all 0s. Thereafter, whenever the clock pulse indicated at (E) in FIG. 10 passes through the AND gate 237d and is applied to the first memory 237b, and outputs L18 through L1 of the first memory 237b changes as follows:

Z10, ... Z1
2×Z10, ... Z1
. . .
$n$ × Z10 ... Z1.

And in response to the clock pulse F2 (See FIG. 10 (F2), the upper ten digits from the most significant digit of the output $n$ × Z10, ... Z1 are stored as

M10, ... M1.

The number of $n$ of the clock pulses represent the intake air volume $Q$, and Z10, ... Z1 is a binary code representing $(1.00 + K')$ so that the first multiplier 237 obtains the product $KQ(1.00 + K')$.

The construction of the signal generator or tachometer 292 is not shown, but it may be of the type comprising a ring gear and an electromagnetic pickup (both not shown) so that 36 pulse signals may be generated for every two rotations of the crankshaft 6. Therefore, the pulse spacing is in inverse proportion to the rotational speed of the engine.

The frequency divider 232 comprises a DC amplifier 232a (for instance, IC, MC 3302P, the product of MOTOLORA Corp.), a binary counter 232b, an AND gate 232c, and an inverter 232d. The output pulses from the signal generator or tachometer 292 are amplified and shaped by the DC amplifier 232a as indicated at (G) in FIG. 10. The frequency division by factors 2, 4, 8, and 15 is carried out by the binary counter 232b. When the frequency division by a factor 15 is started, the AND gate 232c gives the output 1, in response to which the binary counter 232b is reset. Therefore, the pulse signal with the pulse width T appears at the output terminal H of the inverter 232d as indicated at (H) in FIG. 10. The pulse width T equals 8 pulse signals indicated at (G) in FIG. 10, and is in proportion to the reciprocal 1/N of the rotational speed N of the engine.

The second multiplier 238 is substantially similar in construction to the first multiplier 237. While the first multiplier 237 is connected to the oscillator 233, the comparator system 235, and the adder 236, the second multiplier 238 is connected to the frequency divider 232, the oscillator 233, and the first multiplier 237. The output M10, ... M1 from the first mulitplier 237 is multiplied by the number of $n'$ clock pulses generated by the oscillator 233 during the pulse width T of the pulse signal (See FIG. 10 (H)) from the frequency divider 232 so that the output N10, ... N1 representing the product $n'$ × M10, ... M1 may be obtained. That is, the second multiplier 238 obtains the product $KQ (1 + K')/N$.

The converter 239 comprises, in general, a 10-bit binary counter 239a, EXCLUSIVE-OR gates 239b through 239k, a ten-input NOR gate 239l, and a R-S flip-flop 239m. When the binary counter 239a and the R-S flip-flop 239m are reset in response to the OR signal B5 from the shaping circuit 231, the binary counter 239a starts counting the clock pulses from the oscillator 233. When the output Q10, ... Q1 from the binary counter 239a coincides with the output N10, ... N1 from the second multiplier 238, the outputs of all EXCLUSIVE-OR gates are 0 s so that the R-S flip-flop 239m is reset in response to the output from the NOR gate 239l. Therefore, the $\overline{Q}$ output of the flip-flop 239m is 1 as indicated at (I) in FIG. 10 from the time when the R-S flip-flop 239m is reset to the time when it is set. The pulse width of the $\overline{Q}$ output signal is in proportion to the output from the second multiplier 238. In other words, the time interval $\tau$ during which the $\overline{Q}$ output remains 1 represents $KQ (1 + K')/N$ The distributor 240 comprises, in general, OR gates 240a and 240b, a R-S flip-flop 240c, and AND gates 240d and 240e. The R-S flip-flop 240c is set in response to the synchronizing signals B1 and B4 from the shaping circuit 231, and is reset in response to the synchronizing signals B2 and B3 so that the pulse signals as indicated at (O1) and (O2) in FIG. 10 appear at the output terminals Q and $\overline{Q}$. Consequently, the pulse signals with the time width $\tau$ which is in proportion to the intake air volume $Q$ but is in inverse proportion to the rotational speed N to the engine, appear at the output terminals of the AND gates 240d and 240e as indicated at (P1) and (P2), respectively, in FIG. 10. The pulse signal indicated at (P1) in FIG. 10 is applied through the power amplifier 241, whose detailed construction is not shown, to the fuel injection nozzles for the first and fourth cylinders of the engine while, in like manner, the pulse signal indicated at (P2) in FIG. 10, to the fuel injection nozzles for the second and third cylinders. In the engine with the firing order of 1-3-4-2, the fuel injection nozzle for the first cylinder injects the fuel during the suction stroke while the fuel injection nozzle for the fourth cylinder injects the fuel during the combustion stroke, and vice versa. The same is true for the fuel injection nozzles for the second and third cylinders. As described hereinbefore, the fuel injection nozzle for each cylinder injects the fuel two times in each cycle of the engine, i.e., one time at the suction stroke and one more time at the combustion stroke. The total quantity of the fuel to be injected in each cycle of the engine must be made equal to the quantity required in each cycle of the engine. The quantity of the fuel is controlled by setting the frequency of the clock pulses generated by the oscillator 233 shown in FIG. 9a.

The fuel injected by the fuel injection system 200 is admitted into the main combustion chamber 5 and trapped in the trap chamber 8 in a manner substantially similar to that described with reference to the first embodiment. The electronically controlled fuel injection system 200 in accordance with the present invention has an advantage that the quantity of the fuel and the fuel injection timing are exactly controlled in response to the operating conditions of the engine.

In the second embodiment, the pulse signal with the pulse width in inverse proportion to the rotational speed N of the engine has been described as being obtained by the signal generator or tachometer 292 and the frequency divider 232, but it may be obtained from the synchronizing signals B1 through B4 from the shaping circuit 231. In order to determine the pulse width $\tau$ of the pulse signal for determining the valve opening time of the injection nozzle, an analog method may be employed instead of a digital method.

Referring back to FIG. 8, as opposed to the first embodiment, in the second embodiment the trap chamber 8 is defined within a housing 22 with an adapter 21 used for attachment of the spark plug 9.

THIRD EMBODIMENT, FIGS. 11 THROUGH 16

The third embodiment is characterized in that the ratio of the quantity of the fuel injected through the fuel injection nozzle during the suction stroke to the quantity of the fuel through the same fuel injection nozzle injected in another stroke (generally, the combustion stroke) may be varied in response to the operating conditions of the engine.

As shown in FIG. 11, the mean air-fuel ratio $\alpha T$ of the mixture to be supplied to the engine is set relatively low and is of the order of 16 to 17 in the region A where the speed is slow and the load is relatively light and in the region B where the speed is relatively high so that an increase in power is required. However, in the region other than the above regions A and B where the speed is not so fast or slow, the mean air-fuel ratio $\alpha T$ is set relatively high; that is, of the order of 18 to 20.

The air-fuel ratio $\alpha C$ of the rich mixture trapped in the trap chamber immediately before the combustion is started is dependent upon the ratio of the remaining gas; that is, the suction or intake pressure independently of the mean air-fuel ratio $\alpha T$. The rich mixture trapped in the trap chamber may be positively ignited if the air-fuel ratio $\alpha C$ of the rich mixture satisfies the following conditions:

$$\left. \begin{array}{l} \text{Low load: } 9 < \alpha C < 14 \\ \text{high load: } 9 < \alpha C < 16 \end{array} \right\} \quad (1)$$

In the conventional engines, the fuel is injected during the suction stroke in order to satisfy the above conditions (1) with $\alpha T = 16$ to 20. However, the vaporization time for the injection fuel is too short when the fuel is injected during the suction stroke so that the HC emission is increased. Therefore, the quantity of the fuel to be injected during the suction stroke must be reduced as much as possible within the range in which the air-fuel ratio $\alpha C$ of the rich mixture satisfies the condition (1). FIG. 12 shows the results of the experiments conducted with the engine rotational speed of 1,200 rpm and the intake negative pressure of $-420$ mmHg. The ratio of the quantity of the fuel injected during the suction stroke to the total quantity of the fuel injected during each cycle of the engine is denoted by $\lambda f$. It is seen that when the quantity of the fuel injected during the suction stroke is reduced; that is, when $\lambda f$ is less than 0.3, the air-fuel ratio $\alpha C$ becomes too high, resulting in a misfire, a decrease in output, and an increase in HC emission. On the other hand, when the ratio $\lambda f$ is increased larger than 0.3, the air-fuel ratio $\alpha C$ becomes too low, resulting in wetting of the spark plugs, a decrease in output, and an increase in HC emission due to the incomplete varporization of the injected fuel. Therefore, under the above conditions, the optimum ratio $\lambda f$ is approximately 0.3, at which the air-fuel ratio $\alpha C$ is 14. Thus, the experiments confirmed the fact that from the standpoint of the engine output and the HC emission, the ratio $\lambda f$ must be reduced as much as possible as far as the conditions (1) (that is, the range in which the positive ignition is ensured) are satisfied. That is, when the air-fuel ratio $\alpha C$ of the rich mixture trapped in the trap chamber is $$\alpha C = 13 \text{ to } 14 \quad (2)$$

a satisfactory stratified combustion may be ensured.

In order to investigate the conditions for satisfying Eq. (2), the following symbols are used:
Q: intake air volume ($G$/sec)
F: quantity ($g$/sec) of fuel injected during the suction stroke,
Fo: total quantity of fuel to be injected ($g$/sec) during each cycle of the engine,
K: ratio of the volume of the trap chamber to the total volume of the combustion chamber immediately before ignition,
$\eta f$: ratio of the quantity trapped in the trap chamber to the quantity of fuel injected during the suction stroke. The mean air-fuel ratio $\alpha T$ and the air-fuel ratio $\alpha C$ of the rich mixture are given by $$\alpha T = Q/Fo \quad (3)$$

$$\alpha C = \frac{K \cdot Q}{\eta f \cdot F} \quad (4)$$

Since $\lambda f = F/F_o$, Eq. (4) may be rewritten in the form of $$\alpha C = \frac{K \cdot \alpha T}{\eta f \cdot \lambda f} \quad (5)$$

The constant K is a design factor of the trap chamber, and $\eta f$ is regarded as a constant which is dependent upon the chamber, the position of the fuel injection nozzle, and so on of the engine.

Therefore, in order to $\alpha C$ = constant, $$\frac{\alpha T}{\lambda f} \doteq \text{constant } (\alpha T \alpha \lambda f) \quad (6)$$

FIG. 13 shows one example of the relationship between the change in mean air-fuel ratio $\alpha T$ with the air-fuel ratio $\alpha C = 13$ and the ratio $\lambda f$ of the quantity of the fuel injected during the suction stroke to the total quantity of the fuel injected during each cycle of the engine. According to the third embodiment of the present invention the ratio $\lambda f$ of the fuel injection is maintained in proportion to the mean air-fuel ratio $\alpha T$ which changes depending on the operating conditions of the engine. The quantity of the fuel to be injected during the suction stroke may be changed by the fuel injection system of the second embodiment of the present invention which is modified as will be described in detail hereinafter with reference to FIGS. 14, 15, and 16.

Referring to FIGS. 14, 15, and 16, the fuel injection control system 330 of the third embodiment comprises, in general, a shaping circuit 331 for amplifying and shaping the synchronizing signals A1, A2, A3, and A4 from the synchronizing signal generator substantially similar in construction and operation to the synchronizing signal generator of the second embodiment, to produce the synchronizing signals B1, B2, B3, and B4, the reset signal R, and the pulse signals with the pulse width in inverse proportion to the rotational speed N of the engine; a first converter 332 for, in response to each signal R, converting the output voltage signal VQ from the intake air volume sensor (similar to construction and operation to the first sensor shown in the second embodiment) into the binary coded signal and a pulse signal with the pulse width in proportion to the voltage of the output signal VQ; a conventional crystal-controlled oscillator 333 for generating clock pulses of a predetermined frequency; a read-only memory ROM 334 storing therein a predetermined program for executing the operation to be described hereinafter; a second converter 335 for converting the binary coded output signal from the read-only memory 334 into a pulse with a pulse width depending upon the output from the read-only memory 334; an adder 336 for summing up the constant 1, the increment Ds for starting, the increment DI for idling, the increment DF for throttle, and the rise DT in water temperature, the output or sum being binary coded; a first multiplier 337 for obtaining the product between the outputs from the adder 336 and the converter 335; a second multiplier 338 for obtaining the product of the outputs from the first multiplier 337 and the shaping circuit 331; a third multiplier 339 for obtaining the product of the outputs from the first converter 332 and the shaping circuit 331; a third converter 340 for converting, in synchronism with the syncrhonizing signals B1 through B4 from the shaping circuit 331, the binary coded output signal from the second multiplier 338 into a pulse signal; a fourth converter 341 for converting the output from the third multiplier 339 into a pulse signal; a logic circuit 342 to which are applied the pulse signals from the third and fourth converters 340 and 341; and an amplifier 343 for amplifying the output from the logic circuit 342, the output from the amplifier 343 being applied to the fuel injection nozzles.

Figure 15A:
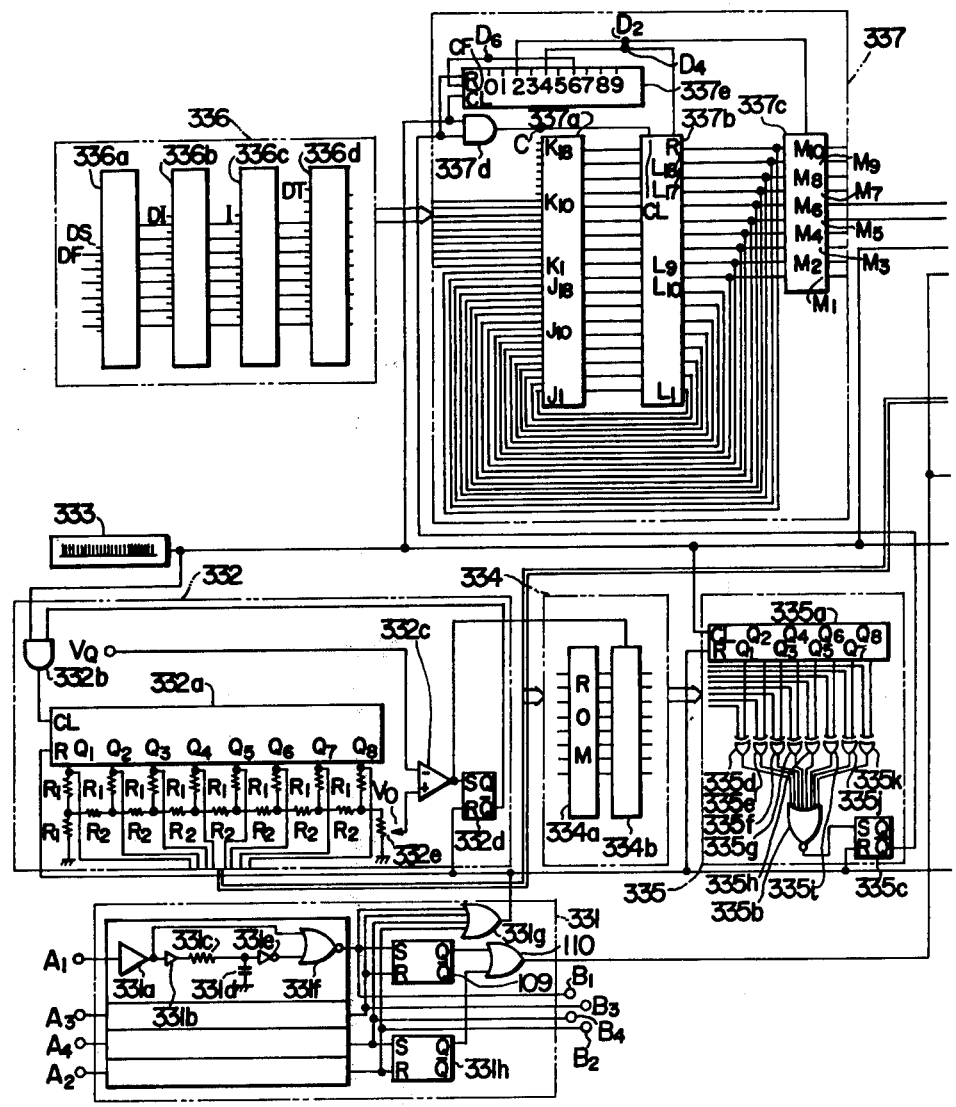
FIGS. 15a and 15b show, in combination, the detailed construction of the control system shown in FIG. 14.
Figure 15B:
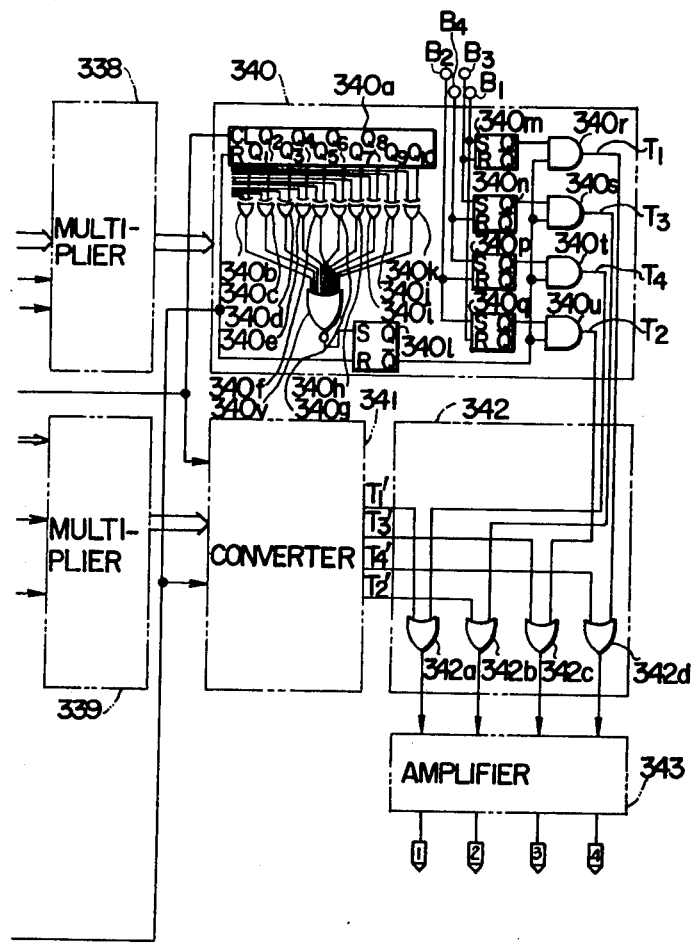

The above components of the fuel injection system 330 will be described in more detail with reference to FIGS. 15a and 15b. The shaping circuit 331 comprises, in general, a DC amplifier 331a (for instance, MC 3302, the product of Motorola Corp.), a buffer 331b, a resistor 331c, a capacitor 331d, an inverter 331e, and a NOR gate 331f, and shapes the synchronizing signal A1 (See FIG. 16 (A1)) from the synchronizing signal generator (not shown) into the synchronizing signal as indicated at (B1) in FIG. 16. In like manner, the synchronizing signals A3, A4, and A2 which are generated in synchronism with the firing order of 1-3-4-2 of the engine are shaped into the synchronizing signals B3, B4, and B2 as indicated at (B3, B4, and B2) in FIG. 16. The OR gate 331g gives the reset signal R, and an R-S flip-flop 331h gives an output signal with a pulse width TN in proportion to the reciprocal of the rotational speed N of the engine as indicated at (TN) in FIG. 16.

The first converter 332 comprises, in general, a binary counter 332a, an AND gate 332b, a comparator 332c, a R-S flip-flop 332d, a variable resistor 332e, and a ladder network consisting of resistors R1 and R2 (R2 = ½ R). When the binary counter 332a and the R-S flip-flop 332d are reset in response to the reset signal R from the OR gate 331g, the AND gate 332b is opened so that the clock pulses from the oscillator 333 are counted by the counter 332a. Therefore, the voltage Vo at the reflected binary code input terminal (+) of the comparator 332c rises as the content in the binary counter 332a increases, and when the voltage Vo exceeds the voltage VQ in proportion to or representative of the intake air volume Q, the R-S flip-flop 332d is set in response to the output signal from the comparator 332c so that the AND gate 332b is closed. The content in the counter 332a is held until the next reset signal R arrives.

Therefore, the time interval TF from the time when the R-S flip-flop 332 is reset to the time when it is set and the content in the binary counter 332a are in proportion to the intake air volume Q, and the input voltage Vo to the comparator 332c and the output signal $\overline{Q}$ of the R-S flip-flop 332d change as indicated at (VO) and (TF) in FIG. 16. Eqs. (1) and (4) are rewritten in the form of $$Fo = Q/\alpha T \quad (1')$$

$$F = \frac{K \cdot Q}{C \cdot \eta \cdot \eta f} = K' \cdot Q \quad (4')$$

$$\text{where } K' = \frac{K}{\alpha C \cdot \eta f}$$

As described hereinbefore, the ratio $\alpha C$ is held constant (13 in the instant embodiment) so that the quantity F of the fuel to be injected during the suction stroke must be made in proportion to the intake air volume Q. For this purpose, the variable resistor 332e in the first converter 332 is suitably adjusted to set the constant K'. Thus the pulse with a pulse width TF may represent the quantity F of the fuel to be injected during the suction stroke. The content in the binary counter 332a also represents the quantity F.

The read-only memory 334 includes two 8-bit read-only memory storages 334a and 334b (the former being for instance, HPROM 1024A, the product of Harris Corp. while the latter, CD 4035, the product of RCA Corp.). The read-only memory storage 334a is so programmed that $$FO = \frac{1}{\alpha T \cdot K'} \cdot F$$

Therefore, in response to the binary coded signal representative of the quantity F from the first converter 332, the read-only memory storage 334a gives the output representative of the total quantity Fo of the fuel to be injected during one cycle of the engine, and is transferred into the second storage 334b in response to the set of the R-S flip-flop 332d. In summary, the read-only storage 334a is so programmed that the mean air-fuel ratio $\alpha T$ may be varied in response to the intake air volume Q which in turn represents the operating conditions of the engine.

The second converter 335 comprises a binary counter 335a, a NOR gate 335b, a R-S flip-flop 335c, and EXCLUSIVE-OR gates 335d through 335k. When the counter 335a and the R-S flip-flop 335c are reset in reponse to the reset signal R, the counter 335a starts counting the clock pulses from the oscillator 333. And when the content in the binary counter 335a coincides with the binary coded output signal representative of the total fuel injection quantity Fo from the read-only memory 334, the outputs of the EXCLUSIVE-OR gates are all 0s so that the output from the NOR gate 335b changes to 1, in response to which the R-S flip-flop 335c is set. Therefore, the time interval TFo (See FIG. 16 (TFo)) of the $\overline{Q}$ output signal from the R-S flip-flop 335c being 1 is in proportion to the total fuel injection quantity Fo.

The adder 336 comprises four parallel adders (for instance, CD 4008, the product of RCA Corp.) 336a, 336b, 336c, and 336d connected in series. To the adder 336 are applied the binary coded signals representative of the increment DF for throttling, the increment Ds for starting, the increment DI for idling, the constant 1, and the increment DT for temperature rise of the cooling water, all of which are set depending upon the operating conditions of the engine. And except the constant 1, the binary coded signals representative of these increments are applied to the adder 336 as needs demand. For instance, the increment Ds is applied only when the starter switch (indicated at 194 in FIG. 8) is closed. The temperature rise signal DT changes in response to the change in cooling water temperature. Thus, the output from the adder 336 is a binary coded signal representative of the sum $$(DF + Ds + DT + DI + 1).$$

The first multiplier 337 comprises a parallel adder (for instance, CD 4008, the product of RCA Corp.) 337a, a memory (for instance, CD 40335, the product of RCA Corp.) 337b, an AND gate 337a, and a counter 337e with a decimal divider (for instance, CD 40117, the product of RCA Corp.). The output L18 . . . L1 from the memory 337b is applied as an input J18 . . . J1 to the adder 337a. When six clock pulses from the oscillator 333 are counter, the counter 337e stops counting. The output signal from the adder 336 is applied as an input K10 . . . K1 to the parallel adder 337a. When the pulse signal (See FIG. 16 (TFo)) with the pulse width TFo from the second converter 335 is 1, n clock pulses from the oscillator 333 pass through the AND gate 337d and appear at its output terminal C as indicated at (C) in FIG. 16. The number n of clock pulses in proportion to the pulse width TFo. When the output from the second converter 335 changes from 1 to 0, the counter 337e starts counting the clock pulses. When the counter 337e counts the second, fourth and sixth clock pulses, the output signals 1 appear at the output terminals D2, D4, D6, respectively, as indicated at (D2), (D4), and (D6) in FIG. 16. In response to the fourth clock pulse D4, the memory 337b in reset so that its output L16 . . . L1 becomes 0 . . . 0.

In response to each clock pulse passing through the AND gate 337d as indicated at (A) in FIG. 16, the output from the memory 337b changes as follows;

$K10 \ldots K1,$ $(2 \times K10 \ldots k1),$

. . .

$n \times k10 \ldots k1.$

In response to the clock signal shown at (D2) in FIG. 16, the upper ten digits from the most significant digit of the output $n \times K10 \ldots K1$ from the memory 337c are stored as $M10 \ldots M1$. As described hereinbefore, the number n of the clock pulses represents the total quantity Fo, and the binary coded input signal $K10 \ldots K1$ represents the sum $(DF + DS + DI + DT + 1)$, the first multiplier 337 gives the product $Fo \cdot)DF + DS + DI + DT + 1)$. The binary coded output signal from the adder 336 consists of ten digits while the binary coded signal representative of the total quantity Fo consists of 8 digits. Therefore, when the upper ten digits of the binary coded output signal are used as the output signal $M10 \ldots M1$, the errors of the input and output are of the same order so that the sufficiently accurate result may be attained.

The second and third multipliers 338 and 339 are substantially similar in construction and mode of operation to the first multiplier 337. However, the second multiplier 338 receives the output $Fo(DF + DS + DI + DT + 1)$ from the first multiplier 337 so that its output signal represents the total quantity of the fuel to be injected during each cycle of the engine; that is, $$Fo \cdot)DF + DS + DI + DT + 1)/N.$$

The third multiplier 339 receives the output from the first converter 332 so that its binary coded output signal represents the quantity of the fuel to be injected during the suction stroke in each cycle of the engine; that is F/N.

The first multiplier 337 accomplishes four arithmetic operations for each cycle of the engine while the second multiplier 338 and the third multiplier 339 accomplish two operations for each cycle of the engine. However, the outputs from these multipliers 337, 338, and 339 are stored so that no problem occurs in the calculation process. Instead of generating the signal TN representative of the rotational speed of the engine from the synchronizing signals B1, B2, B3, and B4, the pulse signals of a frequency in proportion to the rotational speed N of the engine may be derived from a conventional tachometer consisting of a ring gear and electromagnetic pickups, and from this signal the pulse signal with a pulse width in inverse proportion to the rotational speed N may be derived. Therefore, the number of operations executed by the second and third multipliers 338 and 339 may be increased.

The second converter 340 comprises a binary counter 340a, EXCLUSIVE-OR gates 340b through 340k, R-S flip-flops 340l through 340g, AND gates 340r through 340u, and a NOR gate 340v. The R-S flip-flop 340l is operated in synchronism with the reset signal R to convert the signal $Fo(DF + DS + DI + DT + 1)/N$ representative of the total quantity Fo of the fuel to be injected during each cycle of the engine into the pulse signals with pulse widths T1, T3, T4, and T2. Therefore, the AND gates 340r, 340s, 340t, and 340u output the pulse signals with the pulse widths T1, T3, T4 and T2 in synchronism with the synchronizing signals B1, B3, B4 and B2 from the shaping circuit 331 as indicated at (T1), (T3), (T4), and (T2), respectively, in FIG. 16.

The third converter 341 is substantially similar in construction to the second converter 340, and generates, in synchronism with the snychronizing signals B1, B3, B4, and B2 from the shaping circuit 331, the pulse signals with the pulse widths T1', T3', T4', and T2' is proportion to the quantity $F/N$ of fuel to be injected during the suction stroke in each cycle of the engine as indicated at (T1'), (T3'), (T4'), and (T2') in FIG. 16.

The logic circuit 342 comprises OR gates 342a, 342b, 342c, and 342d which output the pulse signals T1, T3, T4, and T2 as indicated at (T1), (T3), (T4), and (T2) in FIG. 16.

The output pulse signals T1, T3, T4, and T2 from the OR gates are amplified by the power amplifier 343, and then applied to the coils of the fuel injection nozzles of the first, third, fourth and second cylinders, respectively, so that the nozzles may be opened during the suction and power strokes of each cycle of the engine.

The read-only memory 334 detects the operating conditions of the engine in response to the signal representative of the intake air volume Q so as to change the mean air-fuel ratio $\alpha T$ (the increments being not taken into consideration), thereby setting the total fuel injection quantity $Fo (= Q/\alpha T)$. Thus, the ratio $\lambda f$ of the mean air-fuel ratio $\alpha C$ may be varied in response to the change in operating conditions of the engine.

So far the control method for attaining the characteristic shown in FIG. 13 with the air-fuel ratio $\doteq 13$ over the whole operating range of the engine has been described, but it is to be understood that, in a strict sense, as shown in Eq. (1) the permissible range of the air-fuel ratio $\alpha C$ is increased as the load is increased and the air-fuel ration $\alpha C$ is increased accordingly so that when the fuel injection ratio $\lambda f$ is also controlled in response to the change in load, the HC emission may be further reduced.

Moreover, when the ratio $\lambda f$ is so controlled that the air-fuel ratio $\alpha C$ may be optimized even when the increments ($DF$, $Ds$, $Di$, and $DT$) are added, a further improvement of the engine efficiency may become feasible.

In the third embodiment, the admission of the fuel injected by the fuel injection system 330 into the combustion chamber and the combustion of the mixture are substantially similar to those described in the first and second embodiments.

What we claim is:

1. An internal combustion engine comprising:
   a cylinder;
   a piston in said cylinder;
   a cylinder head cooperating with said cylinder and said piston to define a main combustion chamber;
   an intake valve having a valve stem and a valve head connected thereto;
   an intake passage communicating with said main combustion chamber for supplying at least air thereto;
   a fuel injection nozzle opening to said intake passage for injecting fuel thereinto, to thereby form an air-fuel mixture therein being mixed with the air supplied to said intake passage;
   a fuel injection control system connected to said fuel injection nozzle for controlling said fuel injection nozzle to inject the fuel at least one time during a suction stroke and at least one more time during a stroke other than said suction stroke;
   a trap chamber disposed in said cylinder head and having at least one suction aperture through which a portion of said air-fuel mixture is introduced into said trap chamber when said intake valve is opened,
   said trap chamber also having at least one discharge aperture through which residual gas remaining in said trap chamber is discharged into said main combustion chamber when said portion of said air-fuel mixture is introduced into said trap chamber, and said trap chamber being entirely closed except for said suction and discharge apertures,
   said suction and discharge apertures being small enough to achieve a torch jet ignition and being always in communication with said main combustion chamber during the time when said intake valve is closed so that the torch jet can spurt through both of said suction and discharge apertures; and
   a spark plug having a set of electrodes for igniting the air-fuel mixture received in said trap chamber.

2. An internal combustion engine as set forth in claim 1,
   wherein said fuel injection nozzle is directed towards the back surface of said valve head and thereby towards said suction aperture of said trap chamber, whereby a part of the fuel injected from said fuel injection nozzle during said suction stroke is effectively introduced into said trap chamber through said suction aperture.

3. An internal combustion engine as set forth in claim 1,
   wherein said fuel injection nozzle is directed towards the back surface of said intake valve, to thereby facilitate the vaporization of the fuel injected from said fuel injection nozzle during said stroke other than said suction stroke.

4. An internal combustion engine as set forth in claim 1,
   wherein said fuel injection nozzle is directed towards said suction aperture of said trap chamber,
   the fuel injected during said suction stroke forms a heterogeneous air-fuel mixture in said intake passage, and
   a portion of the richer air-fuel mixture in said heterogeneous air-fuel mixture is effectively introduced into said trap chamber through said suction aperture.

5. An internal combustion engine as set forth in claim 1, wherein said trap chamber comprises:
means disposed in said trap chamber for guiding the air-fuel mixture introduced in said trap chamber towards said set of electrodes.

6. An internal combustion engine as set forth in claim 1,
wherein said stroke other than said suction stroke is a combustion stroke.

7. An internal combustion engine comprising:
a cylinder;
a piston in said cylinder;
a cylinder head cooperating with said cylinder and said piston to define a main combustion chamber;
an intake passage communicating with said main combustion chamber for supplying at least air;
a fuel injection nozzle opening to said intake passage for injecting fuel thereinto;
a fuel injection control system connected to said fuel injection nozzle for actuating the same to inject the fuel at least one time during a suction stroke and at least one more time during a stroke other than said suction stroke,
the fuel injected during the stroke other than said suction stroke being mixed with the air in said intake passage during the following suction stroke, to thereby form a lean air-fuel mixture,
the fuel injected during said suction stroke being mixed to some extent with said lean air-fuel mixture, to thereby form a rich air-fuel mixture in said intake passage;
a trap chamber disposed in said cylinder head and having at least one suction aperture through which at least a portion of said rich air-fuel mixture is introduced into said trap chamber when said intake valve is opened, the remainder of said rich air-fuel mixture and said lean air-fuel mixture being introduced into said main combustion chamber when said intake valve is opened,
said trap chamber also having at least one discharge aperture through which residual gas remaining in said trap chamber is discharged into said main combustion chamber when said portion of said rich air-fuel mixture is introduced into said trap chamber,
said trap chamber being entirely closed except for said suction and discharge apertures,
said suction and discharge apertures being small enough to achieve a torch jet ignition and being always in communication with said main combustion chamber during the time when said intake valve is kept closed so that the torch jet spurts through both of said apertures; and
a spark plug having a set of electrodes for igniting said portion of said rich air-fuel mixture in said trap chamber.

8. An internal combustion engine as set forth in claim 7, wherein said fuel injection nozzle is directed towards the back surface of said valve head and thereby towards said suction aperture of said trap chamber, whereby a part of the fuel injected from said fuel injection nozzle during said suction stroke is effectively introduced into said trap chamber through said suction aperture.

9. An internal combustion engine as set forth in claim 7,
wherein said fuel injection nozzle is directed towards the back surface of said intake valve, to thereby facilitate the vaporization of the fuel injected from said fuel injection nozzle during said stroke other than said suction stroke.

10. An internal combustion engine as set forth in claim 7,
wherein said fuel injection nozzle is directed towards said suction aperture of said trap chamber, whereby said portion of the rich air-fuel mixture is effectively introduced into said trap chamber through said suction aperture.

11. An internal combustion engine as set forth in claim 7,
wherein said trap chamber comprises:
means disposed in said trap chamber for guiding the air-fuel mixture introduced in said trap chamber towards said set of electrodes.

12. An internal combustion engine as set forth in claim 7,
wherein said stroke other than said suction stroke is a combustion stroke.

13. An internal combustion engine as set forth in claim 7 wherein
said fuel injection nozzle is actuated to inject the fuel when pressurized fuel is supplied thereto; and
said fuel injection control system includes
means for intermittently feeding the pressurized fuel to said fuel injection nozzle at least two times in each cycle of said engine.

14. An internal combustion engine as set forth in claim 13 wherein
said means for feeding the pressurized fuel to said fuel injection nozzle comprises:
a cylinder,
a plunger reciprocally disposed in said cylinder to define a plunger chamber with said cylinder,
a discharge passage hydraulically intercommunicating between said plunger chamber and said fuel injection nozzle,
a discharge valve interposed within said discharge passage,
a cam for causing said plunger to reciprocate within said cylinder in synchronism with the rotation of said engine, whereby the fuel in said plunger chamber is pressurized and forced to flow toward said fuel injection nozzle through said discharge passage with said discharge valve opened, and
means for changing the stroke of said plunger in response to the operating conditions of said engine.

15. An internal combustion engine as set forth in claim 14 wherein
said cam is a solid cam with a three-dimensional cam profile; and
said means for changing the stroke of said plunger is so arranged as to change the position of said cam relative to said plunger.

16. An internal combustion engine as set forth in claim 14 wherein
said cam is so arranged as to cause said plunger to reciprocate at least two times for each cycle of the engine.

17. An internal combustion engine as set forth in claim 7,
wherein said fuel injection nozzle is of a solenoid valve type being actuated in response to a trigger signal from said fuel injection control system to inject the fuel.

18. An internal combustion engine as set forth in claim 17, wherein said fuel injection control system comprises:
intake air volume sensor means for generating and electrical air-volume signal representative of an intake air volume to be supplied to said engine;
rotational speed signal generating means for generating an electrical rotational speed signal representative of a rotational speed of said engine;
first pulse signal generating circuit means for generating a first pulse signal having a pulse width in proportion to said air-volume signal from said intake air volume sensor means;
second pulse signal generating circuit means for generating a second pulse signal having a pulse width in inverse proportion to said rotational speed signal from said rotational speed signal generating means; and
third pulse signal generating circuit means for digitally calculating the intake air volume per rotation of the engine in response to said first and second pulse signals from said first and second pulse signal generating circuit means to generate a third pulse signal having a pulse width representative of or in proportion to the intake air volume, said third pulse signal being applied to said fuel injection nozzle to actuate the same.

19. An internal combustion engine as set forth in claim 17, wherein said fuel injection control system comprises:
intake air volume sensor means for detecting an intake air volume to be supplied to said engine so as to generate a first pulse signal having a pulse width in proportion to the detected intake air volume;
rotational speed detecting means for detecting a rotational speed of said engine so as to generate a second pulse signal having a pulse width in inverse proportion to the detected rotational speed;
arithmetic operation means for accomplishing a digital calculation for obtaining the intake air volume per rotation of the engine in response to said first and second pulse signals from said intake air volume sensor means and said rotational speed detecting means, thereby generating a third pulse signal having a pulse width in proportion to or representative of the calculated intake air volume per rotation of the engine; and
distribution means for, in response to said third pulse signal from said arithmetic operation means, causing said fuel injection nozzle to actuate to inject the fuel during said suction stroke and said stroke other than said suction stroke.

20. An internal combustion engine as set forth in claim 17 wherein
said fuel injection control system includes:
means for changing a ratio of a quantity of the fuel to be injected through said fuel injection nozzle during said suction stroke in each cycle of the engine to a quantity of the fuel to be injected during said stroke other than said suction stroke in response to the operating conditions of the engine.

21. An internal combustion engine as set forth in claim 17 wherein said fuel injection control system comprises:
a synchronizing circuit for generating a group of synchronizing pulses, each being in synchronism with each operation of said combustion chamber, and a train of pulses in response to said group of said synchronizing pulses;
an oscillator circuit for generating clock pulses having a predetermined frequency;
first sensing means, connected to said synchronizing circuit and said oscillator circuit, for generating an air-volume signal having a width proportional to an intake-air-volume to be supplied to said engine for each time when received said train of pulses from said synchronizing circuit;
a first multiplier circuit, connected to said oscillator circuit and said first sensing means, for repeatedly adding a predetermined binary coded value in response to said clock pulses, the number of times of the addition in said first multiplier circuit being controlled by said air-volume signal from said first sensing means, and for generating a first binary coded output signal proportional to said intake-air volume;
second sensing means for generating a rotational speed signal having a width in inverse proportion to a rotational speed of said engine;
a second multiplier circuit, connected to said first multiplier circuit, said oscillator circuit and said second sensing means, for repeatedly adding said first binary coded output signal from said first multiplier circuit in response to said clock pulses, the number of times of the addition in said second multiplier circuit being controlled by said rotational speed signal from said second sensing means, and for generating a second binary coded output signal representing an intake-air volume per a rotation of said engine;
a conversion circuit, connected to said oscillator circuit, said second multiplier circuit and said synchronizing circuit, for generating, for each time when receiving said train of pulses from said synchronizing circuit, a pulse signal having a width proportional to said second binary coded output signal from said second multiplier circuit; and
a distribution circuit, connected to said conversion circuit and said synchronizing circuit, for distributing said pulse signal from said conversion circuit to each fuel injection nozzle in response to said group of synchronizing pulses to actuate the same to inject the fuel in accordance with said pulse width of said pulse signal.

22. An internal combustion engine as set forth in claim 17,
wherein said fuel injection control system comprises:
a synchronizing circuit for generating a group of synchronizing pulses, each being in synchronism with each operation of each combustion chamber, and a train of pulses in response to said group of synchronizing pulses;
an oscillator circuit for generating clock pulses having a predetermined frequency;
first sensing means, connected to said synchronizing circuit and said oscillator circuit, for generating a first binary coded output signal representing an intake-air volume to be supplied to said engine for each time when received said train of pulses from said synchronizing circuit;
a function conversion circuit, connected to said oscillator circuit, said first sensing means and said synchronizing circuit, for generating a function signal having a width for each time when received said train of pulses from said synchronizing circuit, said width of said function signal having a predetermined function relationship with said first binary coded output signal from said first sensing means and representing a function intake-air volume;
a first multiplier circuit, connected to said oscillator circuit and said function conversion circuit, for repeatedly adding a predetermined binary coded value in response to said clock pulses, the number of times of the addition in said first multiplier circuit being controlled by said function signal from said function conversion circuit, and for generating a second binary coded output signal proportional to said width of said function signal;
second sensing means for generating a rotational speed signal having a width in inverse proportion to a rotational speed of said engine;
a second multiplier circuit, connected to said oscillator circuit, said first multiplier circuit, and said second sensing means, for repeatedly adding said second binary coded output signal from said multiplier circuit in response to said clock pulses, the number of times of the addition in said second multiplier circuit being controlled by said rotational speed signal from said second sensing means, and for generating a third binary coded output signal representing a function intake-air volume per a rotation of said engine;
a third multiplier circuit, connected to said oscillator circuit, said first sensing means and said second sensing means, for repeatedly adding said first binary coded output signal from said first sensing means in response to said clock pulses, the number of times of the addition being controlled by said rotational speed signal from said second sensing means, and for generating a fourth binary coded output signal representing a sensed intake-air volume per a rotation of said engine;
a first conversion circuit, connected to said oscillator circuit, said second multiplier circuit and said synchronizing circuit, for generating, for each time when receiving said train of pulses from said synchronizing circuit, a first pulse signal having a width proportional to said third binary coded output signal from said second multiplier circuit;
a second conversion circuit, connected to said oscillator circuit, said third multiplier circuit and said synchronizing circuit, for generating, for each time when receiving said train of pulses from said synchronizing circuit, a second pulse signal having a width proportional to said fourth binary coded output signal from said third multiplier circuit; and
a distribution circuit, connected to said synchronizing circuit and said first and second conversion circuit, for respectively distributing said first and second pulse signals to each fuel injection nozzle in response to said group of synchronizing pulses to actuate the same to inject the fuel in accordance with the respective widths of said first and second pulse signals.

* * * * *